US008833271B2

(12) United States Patent  (10) Patent No.: US 8,833,271 B2
Everett  (45) Date of Patent: Sep. 16, 2014

(54) MODULAR FURNITURE SYSTEM

(76) Inventor: Holly Elizabeth Everett, Marfa, TX (US)

( * ) Notice: Subject to any disclaimer, the term of this patent is extended or adjusted under 35 U.S.C. 154(b) by 0 days.

(21) Appl. No.: 13/810,201

(22) PCT Filed: Jul. 12, 2011

(86) PCT No.: PCT/US2011/043746
§ 371 (c)(1),
(2), (4) Date: Jan. 14, 2013

(87) PCT Pub. No.: WO2012/009376
PCT Pub. Date: Jan. 19, 2012

(65) Prior Publication Data
US 2013/0129405 A1    May 23, 2013

Related U.S. Application Data

(60) Provisional application No. 61/363,603, filed on Jul. 12, 2010.

(51) Int. Cl.
| | |
|---|---|
| *A47B 57/00* | (2006.01) |
| *F16B 12/02* | (2006.01) |
| *A47C 13/00* | (2006.01) |
| *F16B 12/42* | (2006.01) |
| *A47B 87/02* | (2006.01) |
| *F16B 12/46* | (2006.01) |
| *F16B 12/40* | (2006.01) |
| *A47B 13/08* | (2006.01) |

(52) U.S. Cl.
CPC ............... *F16B 12/02* (2013.01); *A47C 13/005* (2013.01); *A47B 2200/0003* (2013.01); *F16B 12/42* (2013.01); *A47B 2220/0072* (2013.01); *A47B 87/0215* (2013.01); *F16B 12/46* (2013.01); *F16B 12/40* (2013.01); *A47B 13/088* (2013.01)
USPC .......................................................... 108/64

(58) Field of Classification Search
CPC ....... A47B 1/06; A47B 87/002; A47B 87/008; A47B 87/0207; A47B 87/0223; A47B 13/10; A47B 17/065
USPC .................. 108/64, 54.1, 66, 103, 92, 94
See application file for complete search history.

(56) References Cited

U.S. PATENT DOCUMENTS

| | | | | |
|---|---|---|---|---|
| 3,241,885 | A | * | 3/1966 | Deaton ........................... 108/64 |
| 3,758,155 | A | * | 9/1973 | Straits ........................... 297/248 |
| 3,858,528 | A | * | 1/1975 | Petersen ......................... 108/60 |
| 3,873,219 | A | | 3/1975 | Pofferi |
| 3,986,316 | A | | 10/1976 | Blodee |
| 4,046,421 | A | | 9/1977 | Spound et al. |
| 4,126,289 | A | * | 11/1978 | Uhlig ....................... 108/157.17 |

(Continued)

FOREIGN PATENT DOCUMENTS

WO        03096843 A2    11/2003

*Primary Examiner* — Jose V Chen
(74) *Attorney, Agent, or Firm* — Thompson Hine LLP

(57) ABSTRACT

A modular furniture system, in which one or more triangular frames are assembled with a leg support system in any of numerous configurations. Cushions or flat surfaces can be supported by the triangular frames to form chairs, beds, sofas, tables, and many other pieces of furniture. Triangle frames are assembled with the leg support system using frame hinges, which can include ring portions that slide over the tops of the leg support system and flanges that attach to the triangular frames.

19 Claims, 23 Drawing Sheets

(56) References Cited

U.S. PATENT DOCUMENTS

| | | | |
|---|---|---|---|
| 4,223,613 A | * | 9/1980 | Yoshizawa ............... 108/64 |
| D259,454 S | * | 6/1981 | Gudgel ............... D16/235 |
| 4,275,666 A | * | 6/1981 | Schriever ............... 108/101 |
| 4,807,540 A | * | 2/1989 | Priesemuth ............... 108/60 |
| 5,438,937 A | * | 8/1995 | Ball et al. ............... 108/64 |
| 5,842,425 A | * | 12/1998 | van der Aa ............... 108/64 |
| 6,161,487 A | * | 12/2000 | Chang ............... 108/64 |
| 7,481,170 B2 | * | 1/2009 | Sommerfield ............... 108/50.02 |
| 7,765,942 B2 | * | 8/2010 | Choi ............... 108/193 |
| 2003/0213415 A1 | * | 11/2003 | Ross et al. ............... 108/64 |

* cited by examiner

MODULAR FURNITURE SYSTEM

RELATED APPLICATION

This application claims the benefit of provisional application Ser. No. 61/363,603, filed on Jul. 12, 2010.

TECHNICAL FIELD

The disclosed subject matter relates generally to the field of furniture. More particularly, the disclosed subject matter is in the technical field of modular transportable and customizable furniture.

BACKGROUND

Pre-assembled furniture tends to be clunky and difficult to transport, while disassembled component furniture often requires tools to assemble and rarely allows a user to customize and re-customize furniture configurations into different types of furniture such as: beds, tables, seating, shelving, and even simple structural shelters. In the wake of an environmental or economic disaster, it becomes necessary to provide large populations with basic customizable furniture that may be easily assembled. Therefore, there is a need for a modular, transportable and customizable furniture system that is easy to configure and reconfigure.

SUMMARY

In general, this document discusses a modular furniture system that includes one or more triangular frames supported by a leg support system. The triangular frames can be connected in numerous configurations and support cushions or boards to create a wide variety of pieces of furniture including, but not limited to, chairs, tables, sofas and end tables. The modular nature of the furniture system allows the system to be customized to the needs of the individual and may also facilitate transport and storage of the system.

The details of one or more embodiments are set forth in the accompanying drawings and the description below. Other features and advantages will be apparent from the description, drawings and from the claims.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawings in which the reference number first appears.

DETAILED DESCRIPTION

The following description is not to be taken in a limiting sense, but is made for the purpose of describing the general principles of the present disclosure. The scope of the present disclosure should be determined with reference to any claims filed in the future, and with the understanding that other changes and modifications to the invention can be made.

Figure 1:
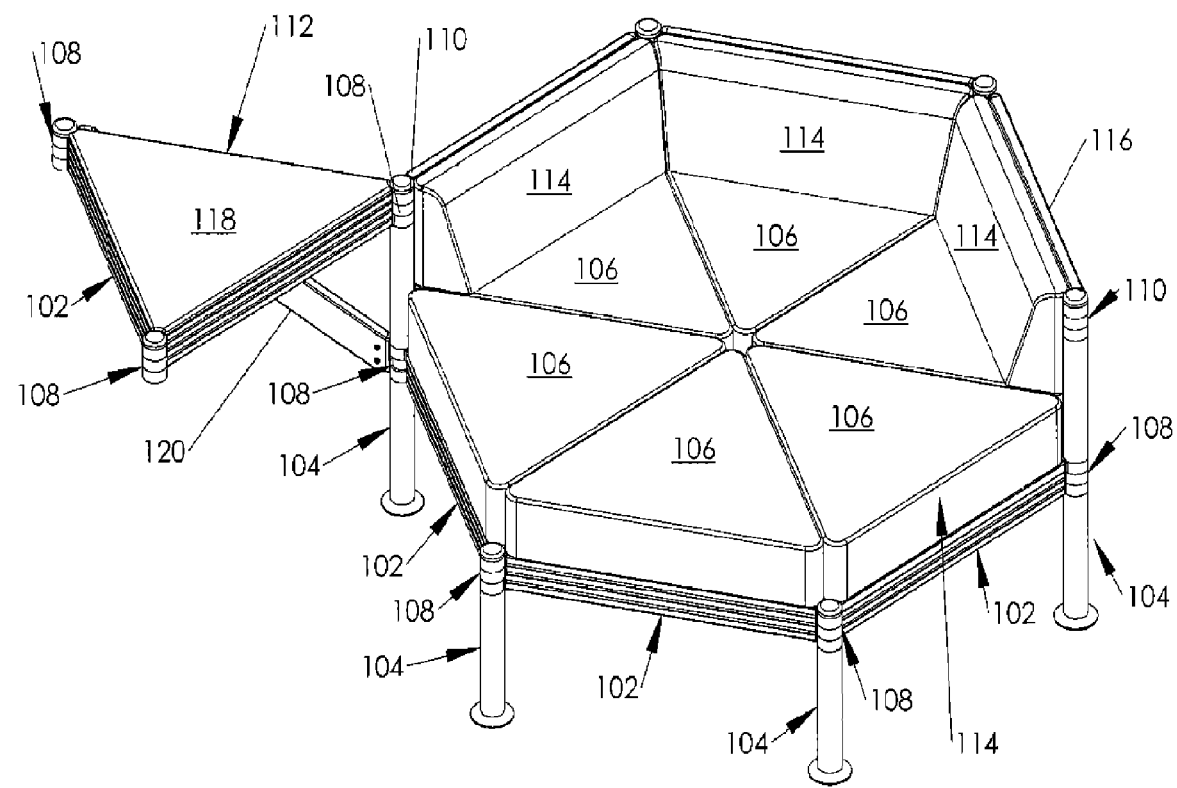
FIG. 1 illustrates an exemplary hexagonal seating design with upper support cushions and an attached table using the furniture system described herein.
Figure 2:
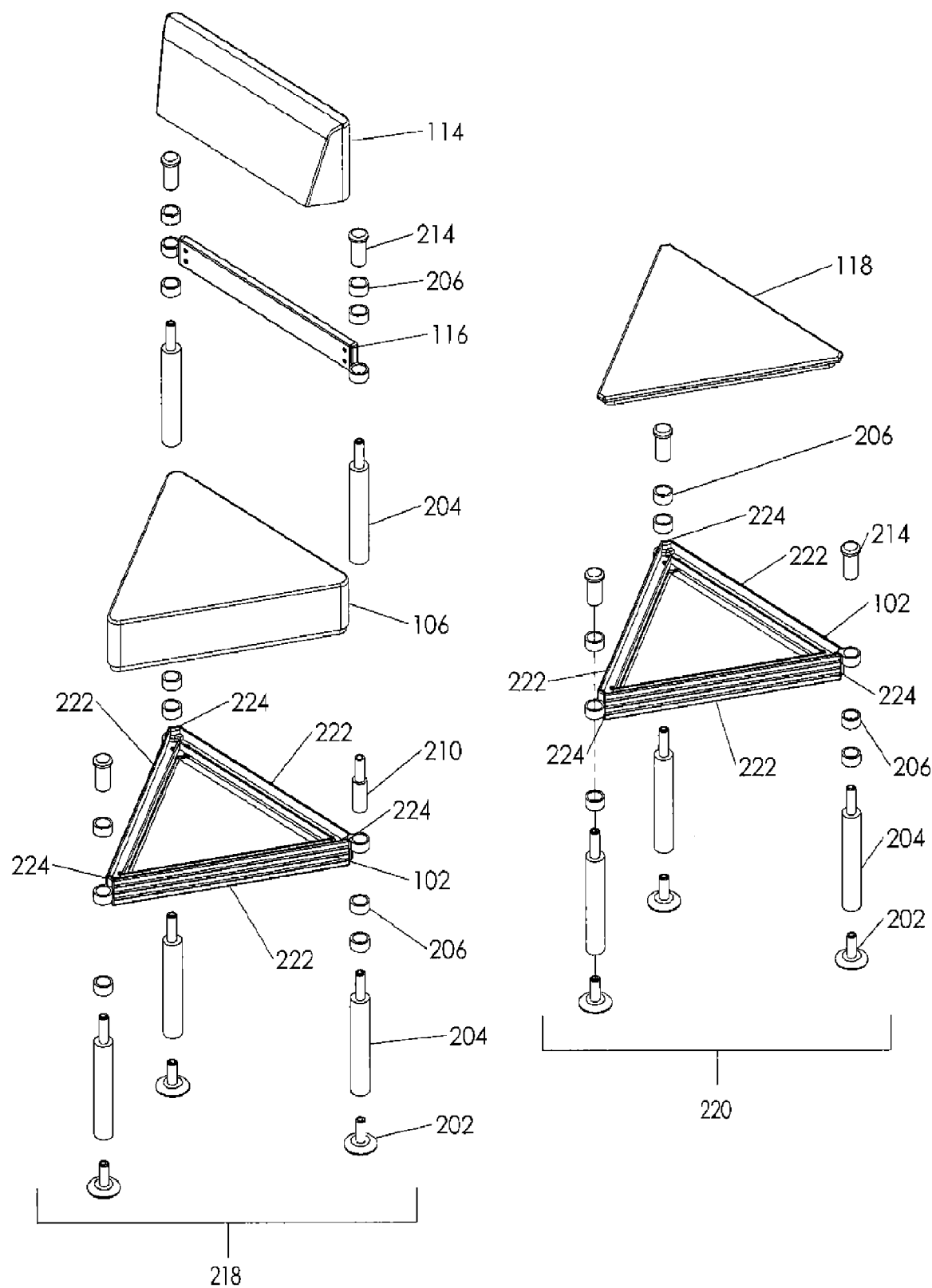
FIG. 2 is an exploded view showing certain components of a chair and table formed using the furniture system described herein.

The disclosed subject matter is a modular furniture system 100, see FIGS. 1 and 2, and, as shown in one embodiment, is comprised of basic components that may be multiplied, configured, and reconfigured to create different types of furniture, including but not limited to beds, tables, seating, shelving, and even simple structural shelters—all without requiring the use of tools. In an exemplary embodiment, the furniture system 100 comprises triangular frames 102, a leg support system 104, soft or hard surfaces (e.g., cushions 106 or table surfaces 118), frame hinges 108, and o-rails 116, as well as other hardware useful to interlock the furniture components together. A basic module of the furniture system 100 is a triangular frame 102 which can be used singularly, such as for a table or shelf 112, or in combination, such that multiple triangular frames are hinged together for seating (e.g., hexagonal seating) or larger tables or shelving.

The disclosed furniture system 100 is a modular construction such that pieces of furniture can be made as small or large, or as simple or complex as needed by assembling selected components in various configurations. The disassembled components can be light-weight, easily packaged and transported. Also, the flexibility of the modular design of the present furniture system gives it a universal appeal for residential use, e.g., homes, apartments, and dorm rooms, as well as for commercial use, e.g., hotels, schools, businesses, and public areas.

Further, the disclosed furniture system 100 is a solution to a chronic and pervasive problem: supplying large populations with basic human comforts in the wake of environmental or economic devastation. It is designed for easy assembly to provide furniture in disaster housing, a forest hut, or even the interior of a cave. It can be adapted to give comfort to people of different global cultures and styles. Disassembled, the components of the furniture system 100 can be carried easily through narrow spaces, elevators, or stairwells, hence solving a surprisingly common problem—that furniture and furniture components may be too large to transport to certain rooms and locations.

In embodiments, the furniture system 100 easily hinges together and due to its triangular design, distributes considerable weight, where each of the basic triangular frames 102, is supported by three leg support systems 104 to provide a stable platform. Further, the furniture system 100 can grow and evolve (with its users as demand grows) through the addition of components. There are dozens of additional modules which seamlessly add-on to the base components.

The frame components of the furniture system 100, such as the leg supports or portions of the triangular frames 102, can be made out of a variety of materials, including wood or metal. In an embodiment, such components are molded out of lightweight, inexpensive, renewable, and recyclable materials such as plastic or composite material. The use of lightweight, durable materials, combined with economical packaging could save enormous energy and resources during storage and transport.

In embodiments, the furniture system 100 is designed to use readily available materials. For example, the sizes of all hard and soft surface materials (cushion foam, plywood, recycled plastics, and composite resins) are generally available in 24-48" widths. Accordingly, in an embodiment, the interior of the standard triangular frame 102 may be scaled to conform to such standard sizes to conserve materials and reduce waste. The triangular frame 102 also may have either a hard surface (e.g., for a table or shelf 112) or a soft surface (e.g., cushion 106 used for seating). In another embodiment, an inflatable cushion can be used with a triangular frame 102 of the furniture system 100, providing multi-functionality with even fewer components and easier transport and storage.

The furniture system 100 may be produced as a high-end product or a low-end product, as well as an indoor or outdoor product. The target use of a particular furniture design dictates what types of materials are used. For example, a high-end, indoor furniture design may use chrome and leather, whereas a low-end, outdoor furniture design may use plastic and all-weather cushions. Further, the furniture system 100 allows for many different aesthetically pleasing and functional designs, which can conform to both residential and commercial settings. Cushions 106, shelves 112, and leg support systems 104 can be produced in a variety of colors, finishes and patterns.

The figures illustrate exemplary components of the furniture system 100 and certain possible designs and configurations that may be created using the furniture system 100. It should be understood that the illustrated furniture designs are for convenience only and should not be construed as the only possible designs that may be created using the components of the furniture system 100. For example, the height of the leg support system 104 can be increased by stacking multiple vertical supports 204. Leg support systems 104 that are only one vertical support 204 in height may be used for a coffee table. If a cushion 106 or soft surface is added the furniture can be a sofa or bed to which an upper support cushion 114 or a headboard could optionally be added. The upper support cushions 114 may be used to provide back support or optionally placed on the side of the configuration and used as a side cushion or arm rest. Leg support systems 104 that stack additional vertical supports 204 can increase the height of furniture to standard tabletop height. In another embodiment, stacking yet another vertical support 204 results in a leg support system 104 for bar height furniture. In other embodiments, the stacking of vertical supports 204 and triangular frames 102 creates modular shelving units as shown in FIG. 8.

FIG. 2 is an exploded view showing certain components of a chair 218 and table 220 of the furniture system 100. A principal component of the furniture system 100 is a triangular frame 102 having three frame rails 222, three vertices 224, and a frame surface being either a soft surface, e.g., a cushion 106, or a hard surface, e.g., a board 216. A hinge system including a plurality of frame hinges 108 interconnects the frame rails 222. A second principal component of the furniture system 100 is a leg support system 104 for supporting the furniture, such as the chair 218 and table 220 of FIG. 2. The leg support system 104 can include a plurality of vertical supports 204, bottom caps 202, spacer rings 206, spacer bars 210, and top caps 214, all of which can be slidably and removably interconnected, and which support the triangular frame 204 at its vertices 224. In an embodiment, a leg support system 104 is assembled to support a vertex 224 of a triangular frame 102, by inserting a bottom cap 202 into a bottom end of a vertical support 204. One or more spacer rings 206 can be inserted on the top end of the vertical support 204. A frame hinge 108 can be removably slid onto the top end of the vertical support 204, after which another spacer ring 206 may be slid onto the vertical support 204 as well as a top cap 214. Once the triangular frame 102 is assembled with its leg support system 104, the design can easily become a chair 218 by adding a cushion 106 to the triangular frame 102 or a table 220 by adding a board 216 to the triangular frame 102.

Figure 3:
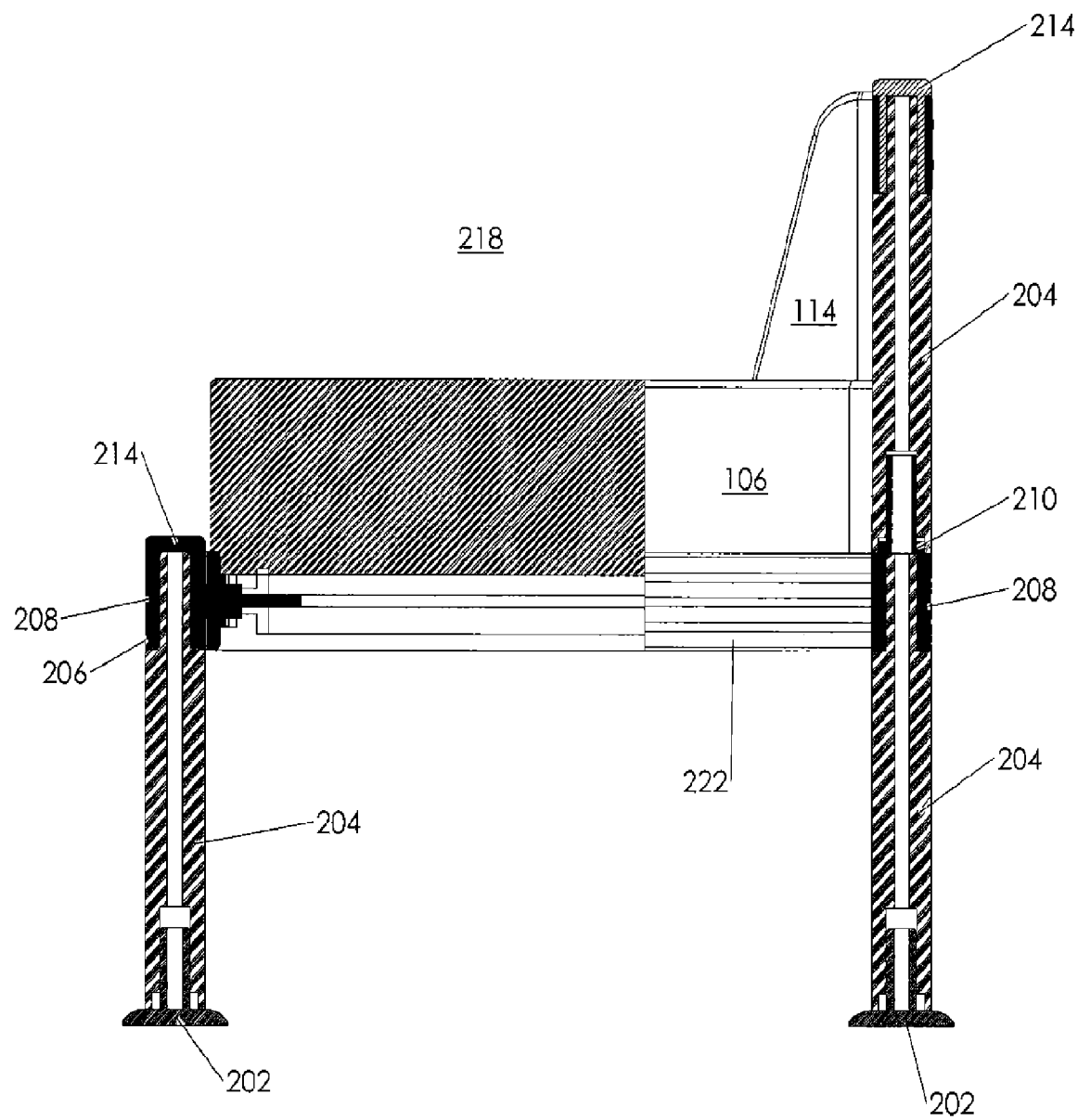
FIG. 3 is a partial cutaway of a cross-sectional side view of a chair formed using the furniture system described herein.

As also shown in FIG. 2, an upper support cushion 114 can be attached to the chair 218 to provide back support by adding a second level of vertical supports 204 to the top of spacer bars 210 (which were placed onto the top of the first level of vertical support 204). As depicted in the embodiment illustrated in FIG. 2, vertical supports 204 are stacked on top of two of the vertices 224 of the triangular frame 102 in place of top caps 214. This creates the second level of vertical supports 204. An o-rail 116 can be connected to the top of each vertical support 204 in the second level of vertical supports 204 to provide support to the upper support cushion 114. In another embodiment, the upper support cushion 114 is attached to the o-rail. For example, the upper support cushion 114 can be attached by simple loops in the fabric, Velcro or any other suitable means. The o-rail 116 is slidably removable onto the second level of vertical support 204, after which additional spacer rings 206 and top caps 214 can be added. A partial cutaway of a cross-sectional side view of the embodiment of an assembled chair 218 is shown in FIG. 3. Thus, because the frame hinges 108 of the furniture system 100 are uniform and hidden, they can be used in such a way that allows for endless customization of furniture designs.

Figure 4:
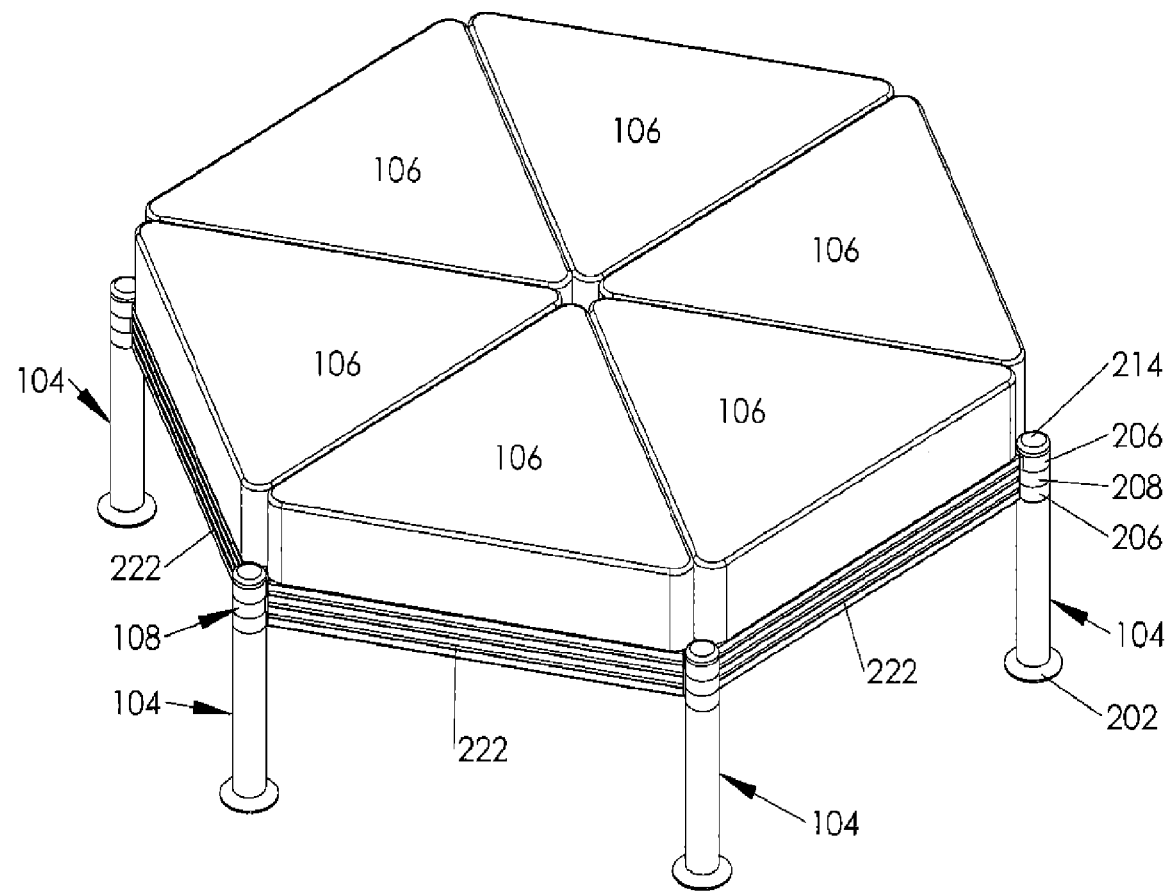
FIG. 4 illustrates an exemplary hexagonal seating design using the furniture system described herein.
Figure 5:
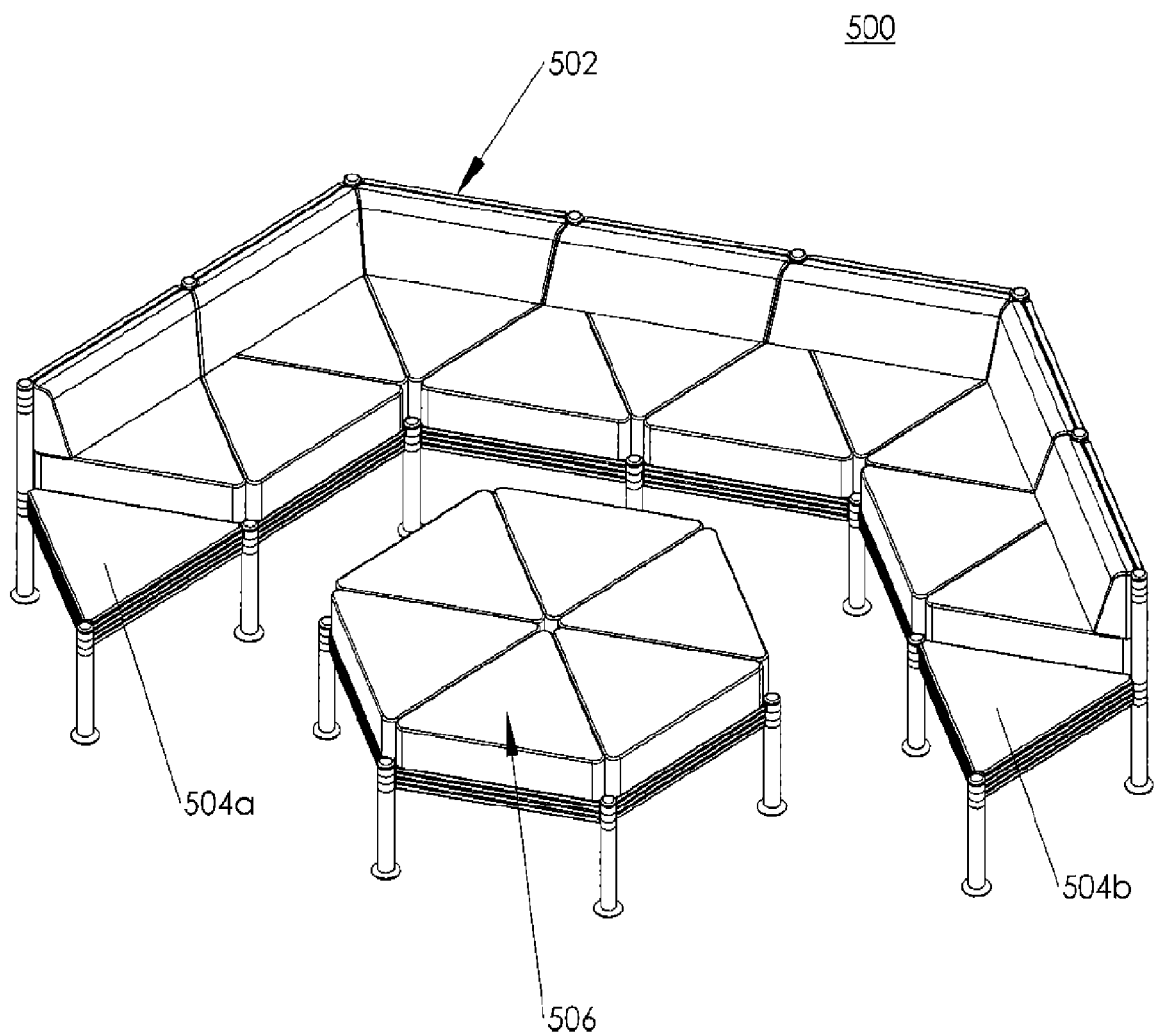
FIG. 5 illustrates an exemplary C-shaped seating design with two end tables and a center seating area using the furniture system described herein.
Figure 6:
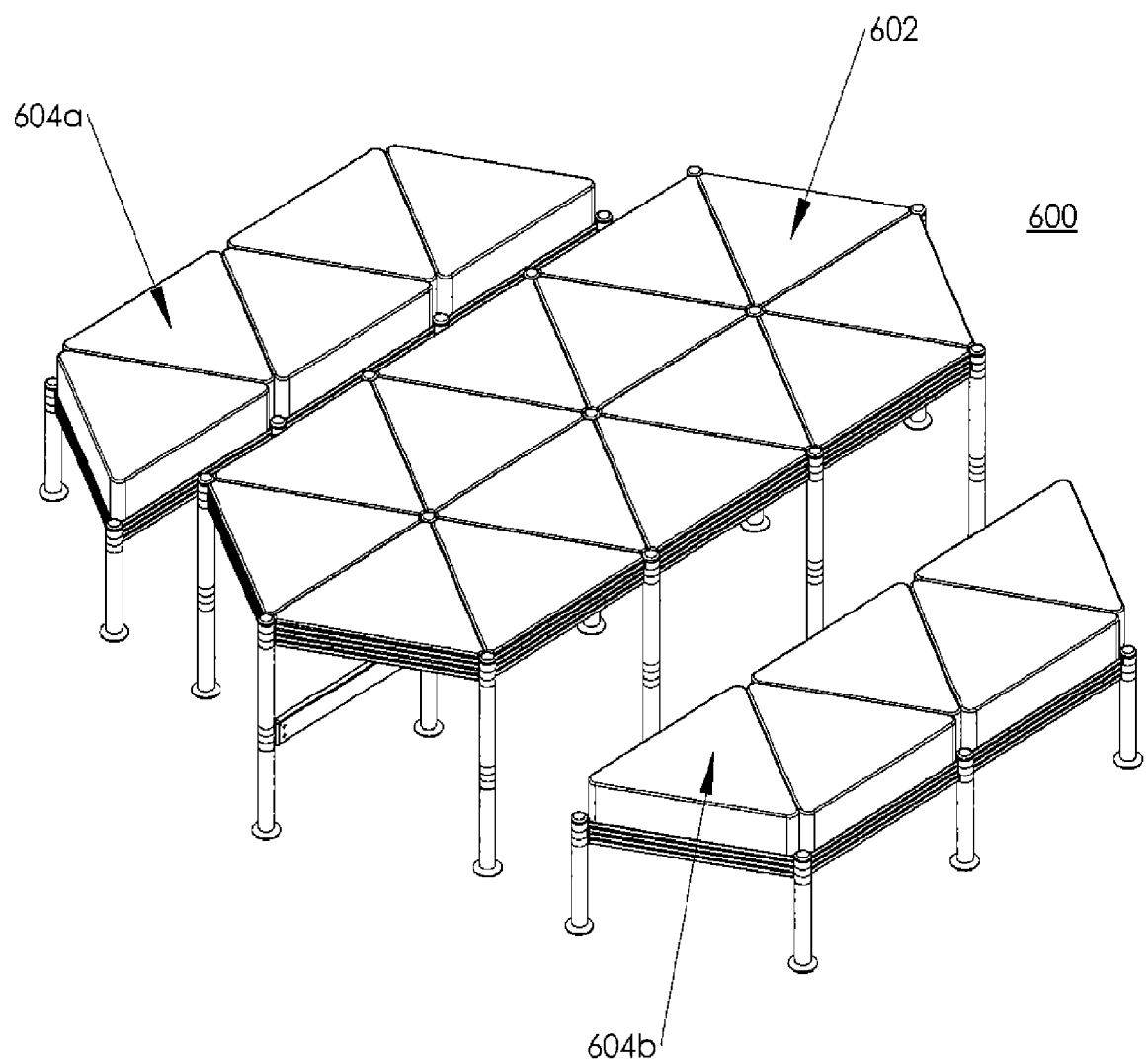
FIG. 6 illustrates an exemplary center table with two bench seating arrangements using the furniture system described herein.
Figure 7:
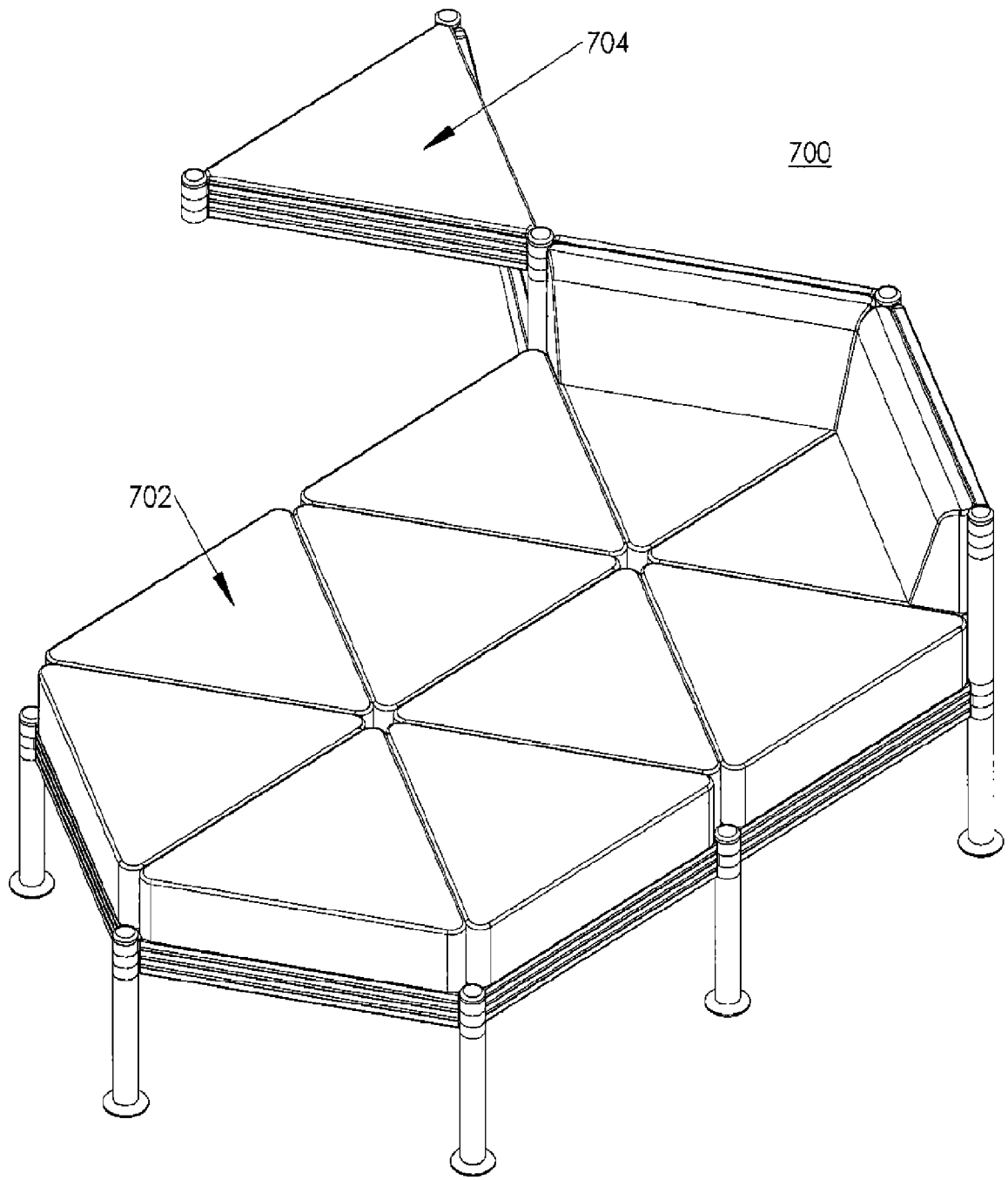
FIG. 7 illustrates an exemplary large seating design or lounge with upper support cushions and an attached table using the furniture system described herein.
Figure 8:
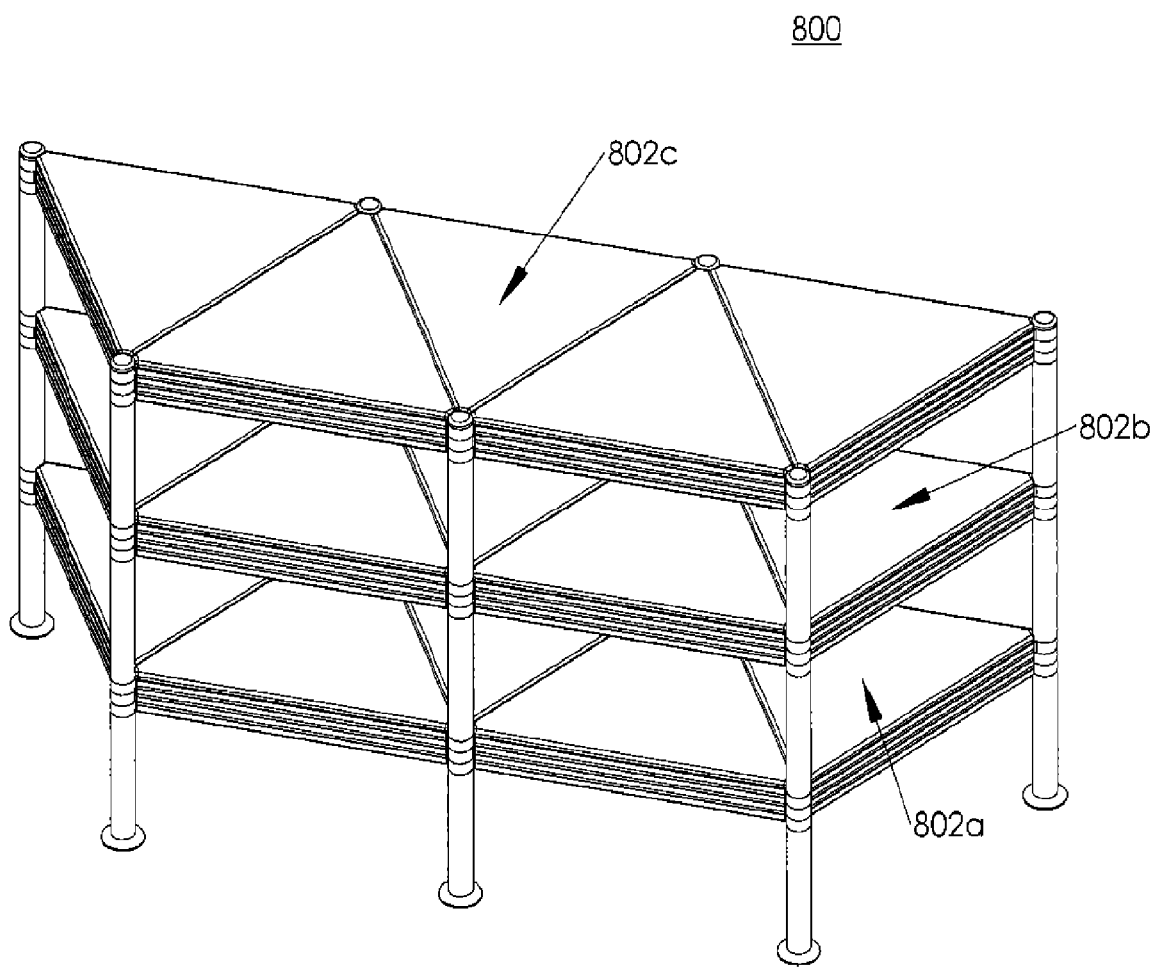
FIG. 8 illustrates an exemplary stacked shelving design using the furniture system described herein.
Figure 9:
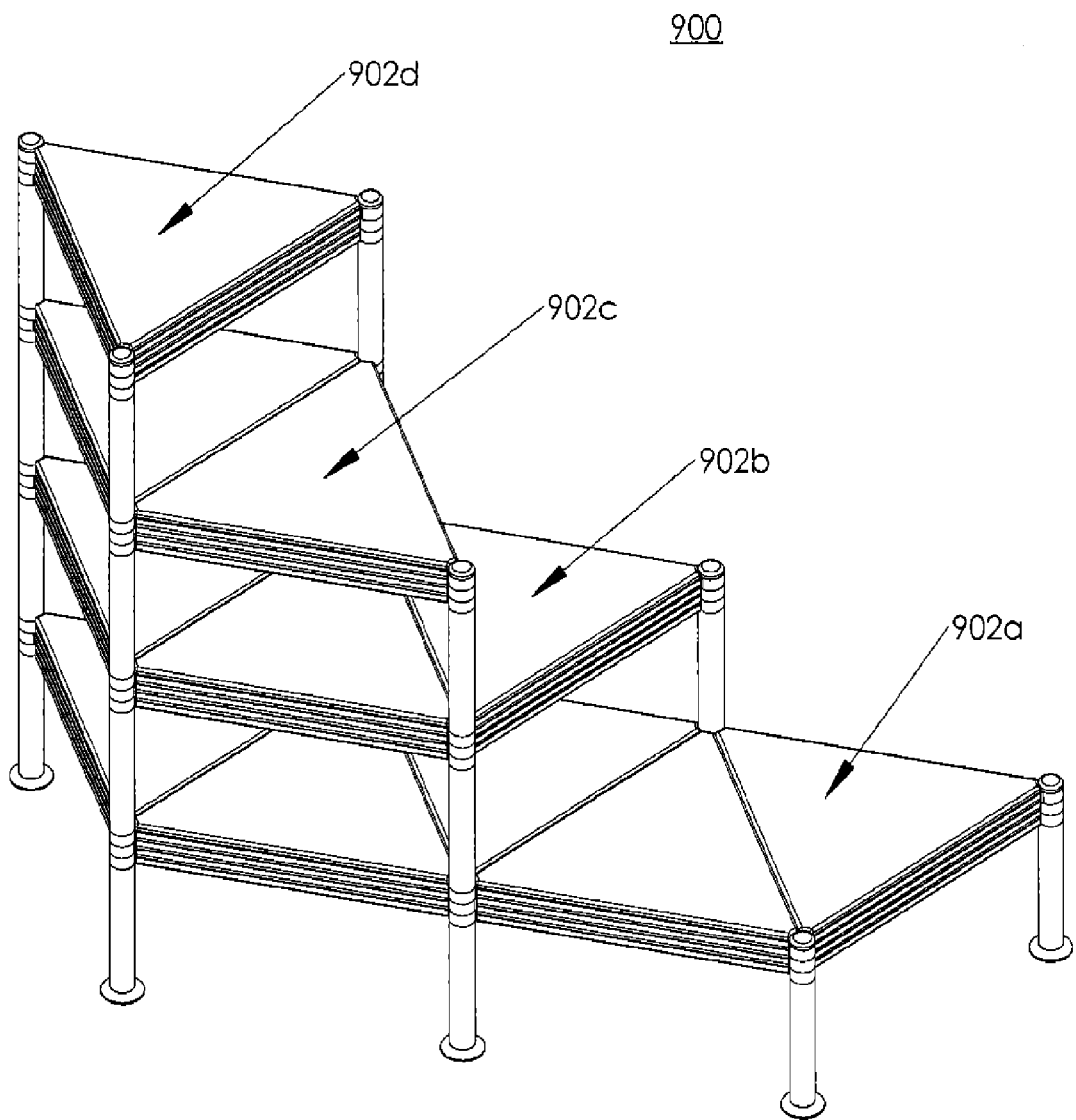
FIG. 9 illustrates a second exemplary stacking shelving design using the furniture system described herein.

FIGS. 4-9 illustrates various examples of furniture designs using the furniture system 100 of the present invention. The triangular frames 102, leg support system 104, frame hinges 108, and other components of the furniture system 100 are used in different configurations to achieve the desired piece of furniture. Also, because of the modular, easy-to-use component design, these pieces of furniture can be easily disassembled and reconfigured into a new design. FIG. 4 shows an exemplary hexagonal seating design 400; FIG. 5 shows an exemplary design 500 having a C-shaped seating design 502 with two end tables 504a, 504b and a center seating area 506. FIG. 6 shows an exemplary design 600 having a center table 602 with two bench seating arrangements 604a and 604b. FIG. 7 shows an exemplary design 700 having a large seating area 702 with upper support cushions and an attached table 704. FIG. 8 shows an exemplary stacked shelving design 800 having three tiers or levels of shelving 802a, 802b, and 802c, each level created using a set of triangular frames 102. FIG. 9 shows a second exemplary stacking shelving design 900 having four tiers or levels of shelving 902a, 902b, 902c, and 902d.

Figure 10:
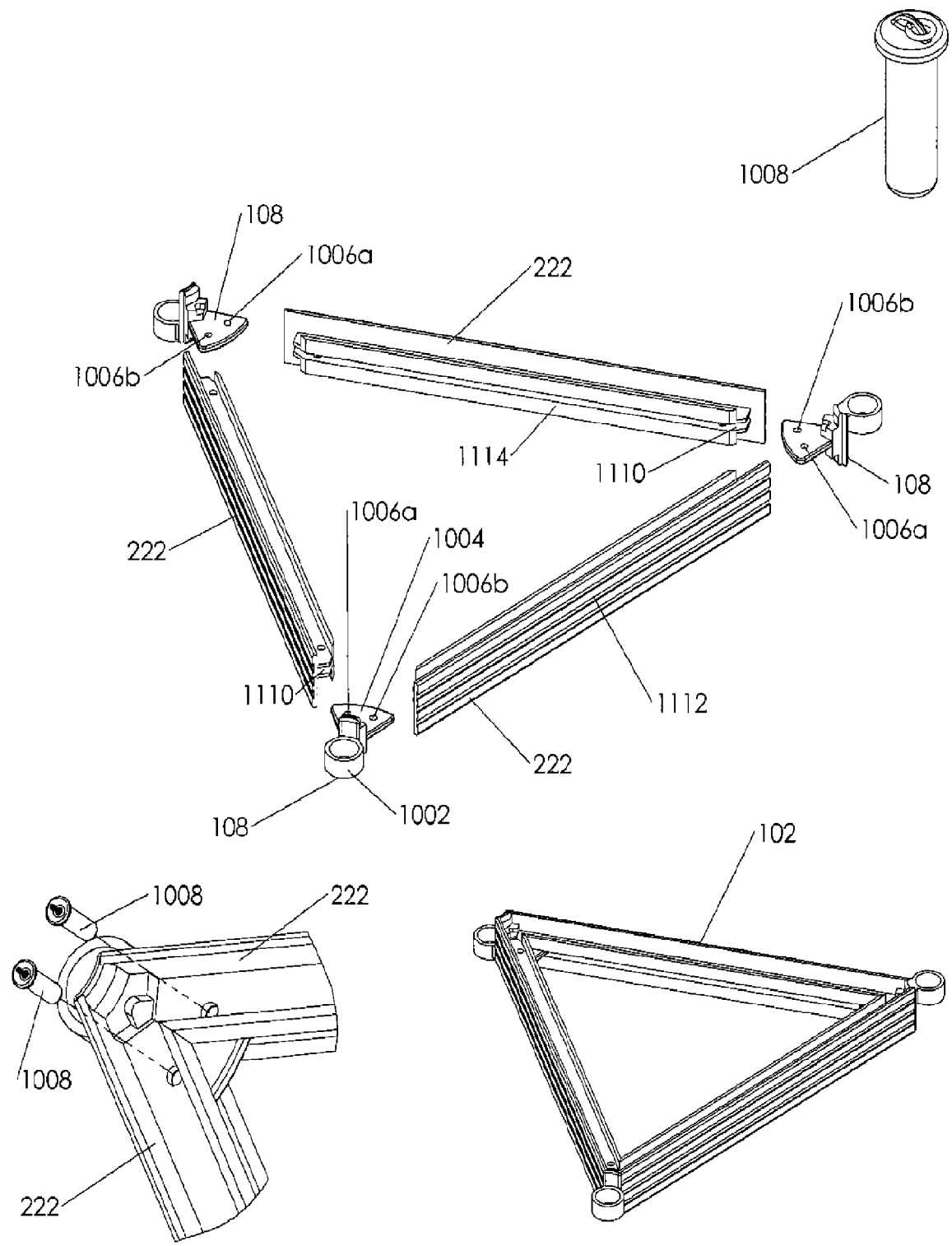
FIG. 10 illustrates an embodiment of a disassembled triangular frame of the furniture system described herein.
Figure 11:
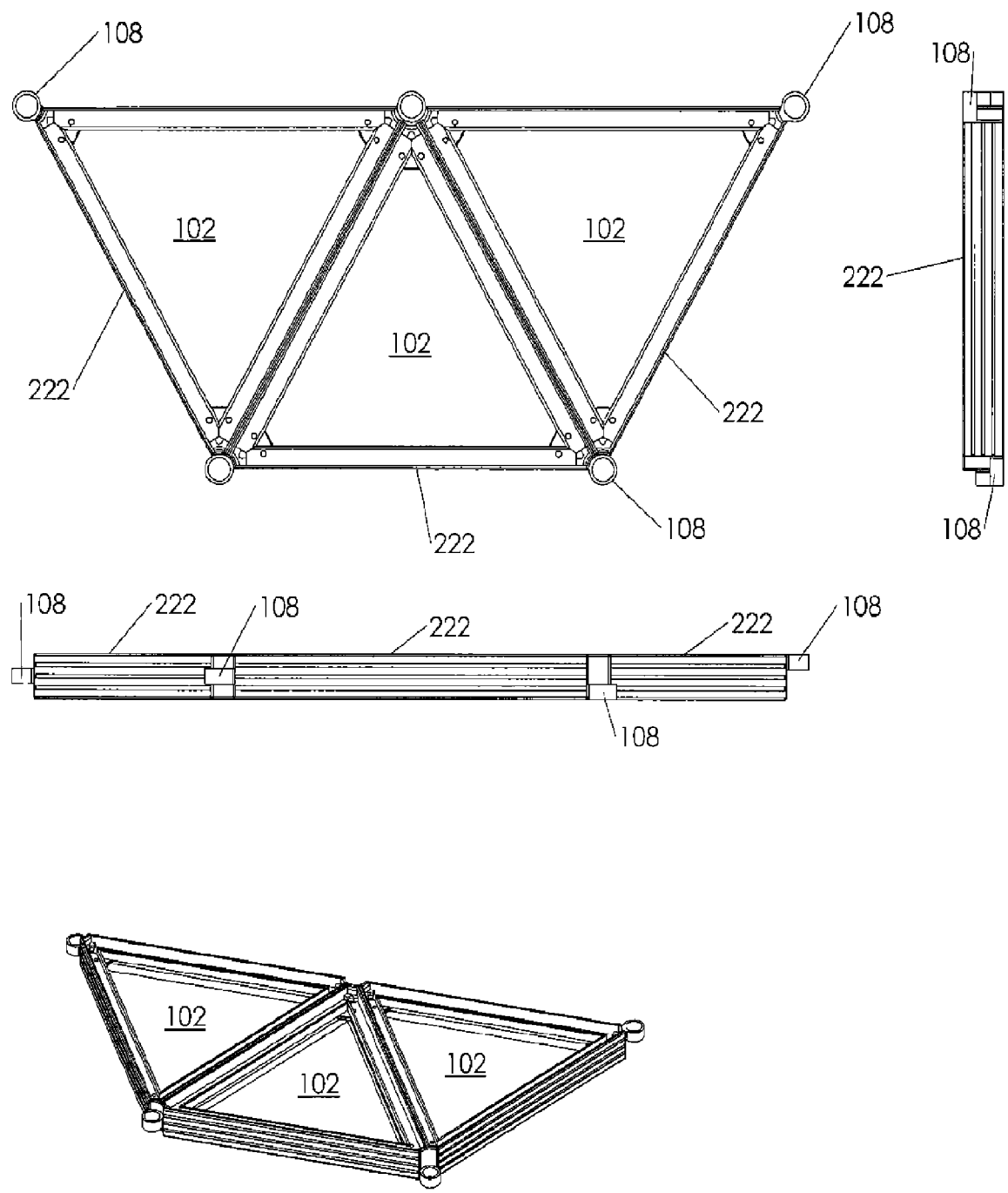
FIG. 11 illustrates an exemplary three triangular frame of the furniture system described herein.

FIG. 10 shows a disassembled triangular frame 102 having three frame rails 222 and three frame hinges 108. Each frame rail 222 has an exterior side 1112 and an interior side 1114, with a receiving mechanism within said interior side 1114. Each frame hinge 108 has a ring portion 1002 and a connecting mechanism for interconnecting the frame hinge 108 to the receiving mechanism of a frame rail 222. In one embodiment, the connecting mechanism is a flange portion 1004 and the receiving mechanism is an interior channel 1110 such that the flange portion 1004 of a frame hinge 108 slides into and is disposed within the interior channel 1110 of a frame rail 222, thereby interconnecting the frame rail 222 with the frame hinge 108. Also, in certain embodiments a hinge pin 1008 is used to further secure a frame rail 222 to the flange portion 1004 of a frame hinge 108. The flange portion 1004 may have two holes 1006a and 1006b such that a first hinge pin 1008 passes through a first hole 1006a in the flange portion 1004 and a hole in the interior side 1114 of a first frame rail 222, and a second hinge pin 1008 passes through a second hole 1006b in the flange portion 1004 and a hole in the interior side 1114 of a second frame rail 222. The use of hinge pins 1008 to secure a frame rail 222 to a flange portion 1004 of a frame hinge 108 is for convenience. It is understood to those of ordinary skill in the art that other means for securing two component parts of a frame work equally as well. Accordingly, FIG. 11 shows an exemplary design whereby three triangular frames 102 are joined together using the frame hinges 108 and hinge pins 1008 as described above.

Figure 12:
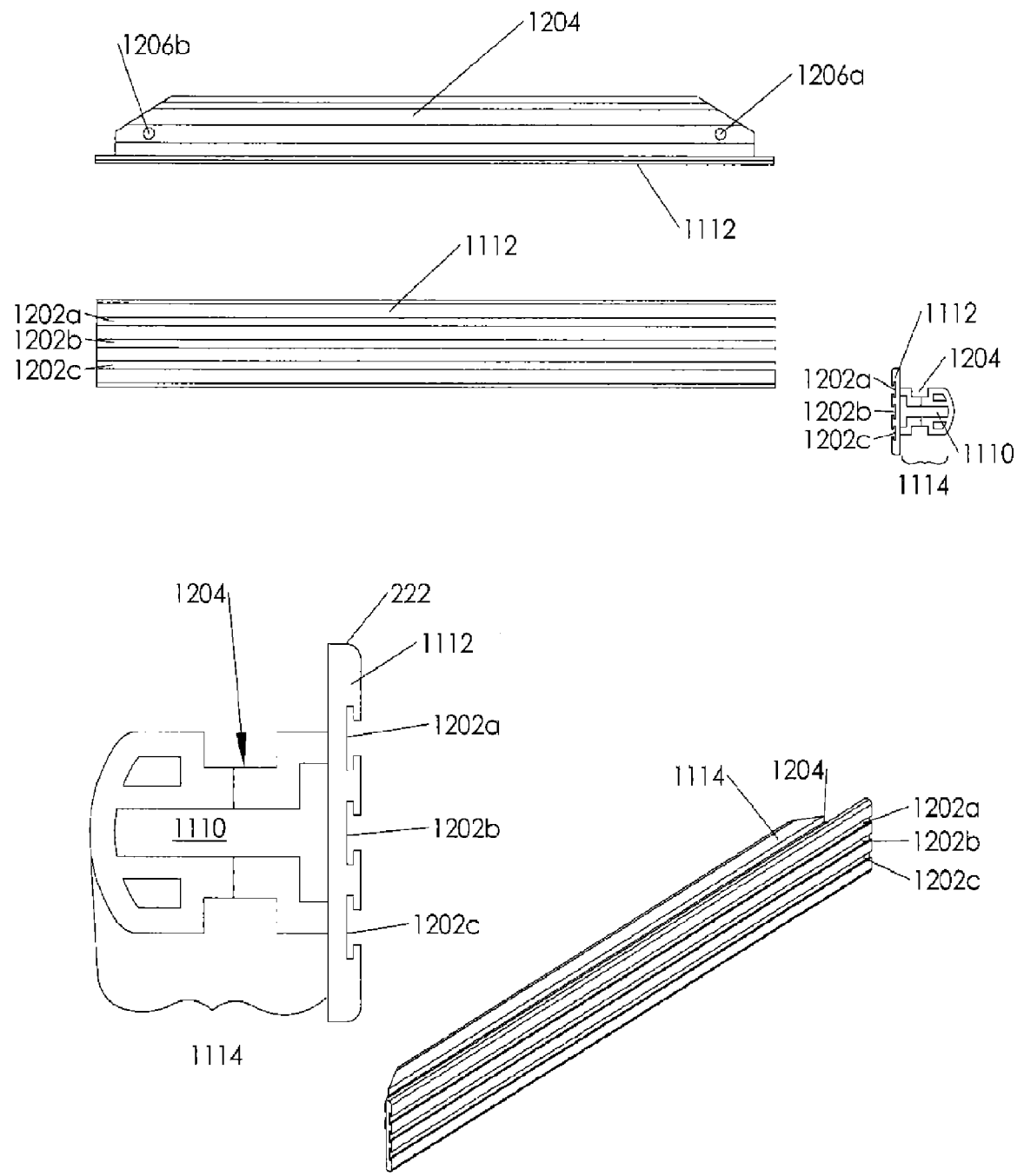
FIG. 12 illustrates an embodiment of a frame rail of the furniture system described herein.

FIG. 12 shows an exemplary embodiment of a frame rail 222 wherein the external side 1112 of the frame rail 222 has three channels 1202a, 1202b, and 1202c. These channels 1202a, 1202b, 1202c are useful to removably attach a decorative panel to the exterior side 1112 of the frame rail 222. Additionally, FIG. 12 shows an exemplary frame rail 222 wherein the internal side 1114 of the frame rail 222 has an interior channel 1204. Interior channel 1204 is useful to secure cushion 106, table surface 118, or other similar surfaces to the frame rails 222 that comprise the triangular frames 102. In one embodiment, interior side 1114 may have two holes 1206a and 1206b to further secure a frame rail 222 to the flange portions 1004 of a first frame hinge 108 and second frame hinge 108. The flange portion 1004 of the first frame hinge 108 may have a first hole 1006a such that a first hinge pin 1008 passes through a first hole 1006a in the flange portion 1004 and a hole 1206a in the interior side 1114 of a frame rail 222, and a second hinge pin 1008 passes through a second hole 1006b in the flange portion 1004 of the second frame hinge 108 and a hole 1026b in the interior side 1114 of the frame rail 222. As discussed above, the use of hinge pins 1008 to secure a frame rail 222 to a flange portion 1004 of a frame hinge 108 is for convenience. It is understood to those of ordinary skill in the art that other means for securing two component parts of a frame work equally as well.

In the embodiment illustrated in FIG. 12, the ends of the internal side 1114 of the frame rail 222 are tapered. In embodiments, each end of the of the internal side 1114 is cut or formed at a diagonal from the end of the frame rail 222, such that if two frame rails 222 meet at a vertex, they form a mitered joint, as can be seen in FIG. 10. In another embodiment, not shown, the ends of the internal side 1114 of the frame rail 222 may be notched, set back or removed from the ends of the frame rail 222 to facilitate manufacture and potentially to reduce material costs.

Figure 13:
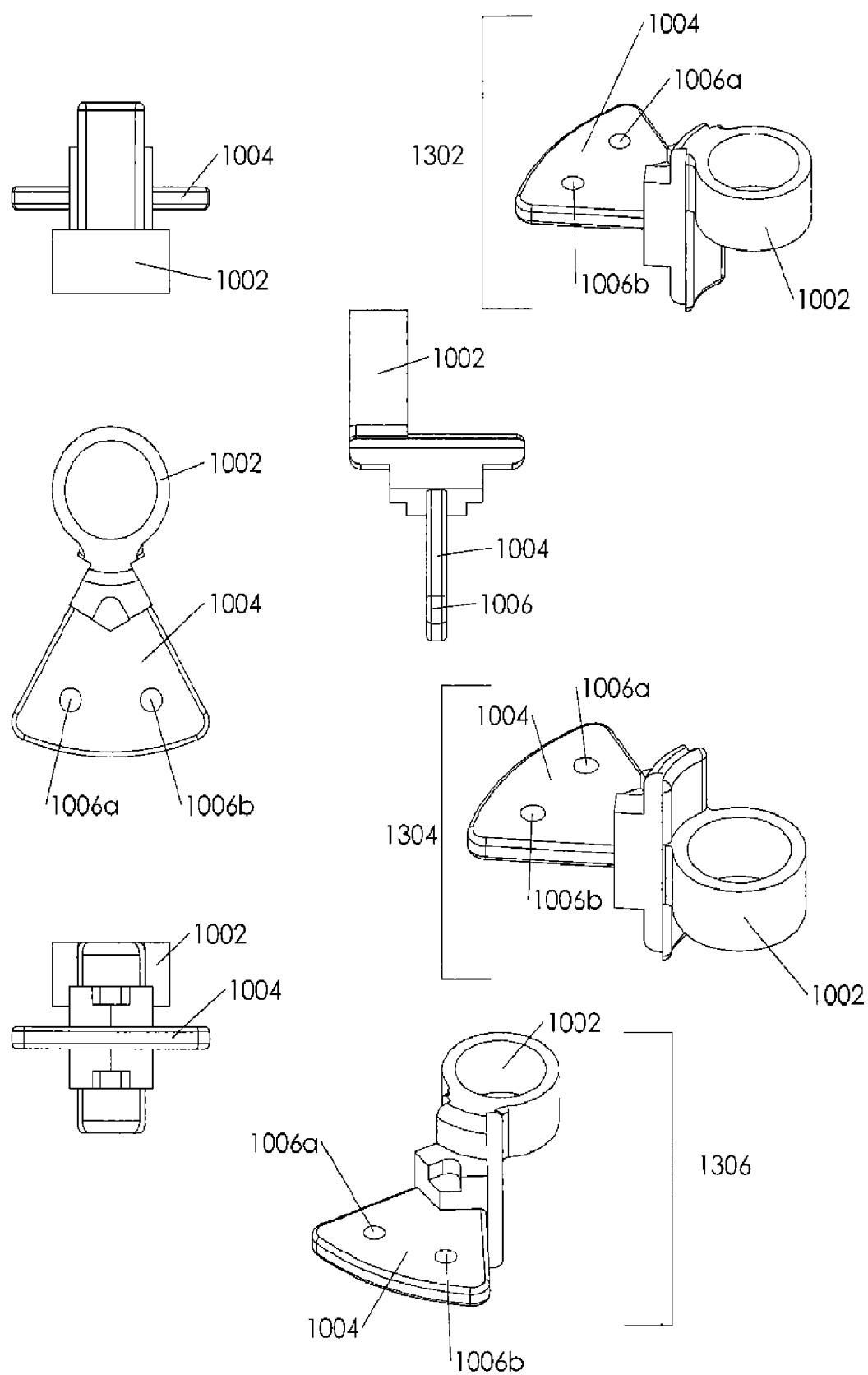
FIG. 13 illustrates three exemplary frame hinges of the furniture system described herein.

FIG. 13 shows three exemplary frame hinges 108. In certain embodiments the position of the flange portion 1004 varies relative to the ring portion 1002. For example, in an embodiment, the furniture system 100 includes three or more types of frame hinges 108 based upon the position of the flange portion 1004 relative to the ring portion 1002: a high flange frame hinge 1304, a mid-flange frame hinge 1302 and a lower flange frame hinge 1306. In the high flange frame hinge 1304, the flange portion 1004 is approximately aligned with the center of the ring portion 1002. In the mid-flange frame hinge 1302, the top surface of flange portion 1004 is approximately aligned with the lower edge of the ring portion 1002, and in the lower flange frame hinge 1306, the flange portion 1004 is located below the ring portion 1002. The high flange frame hinge 1304, mid-flange frame hinge 1302 and lower flange frame hinge 1306 are exemplary configurations and the flange portion 1004 can be positioned at numerous locations relative to the ring portion 1002.

As previously described, frame hinge 108 may have its flange portion 1004 located at various positions relative to the ring portion 1002. In an embodiment, the various flange portion positions allow the connection of frame hinges 108, to the same vertical support 204 while maintaining a level surface between connected triangular frames 102. In an embodiment, the various flange portion positions allow users to maintain a level surface between connecting triangular frames 102 when a corresponding vertical support 104 is also needed to connect a diagonal support rail 120, as depicted in FIG. 11n an embodiment, spacer rings 206 are used in combination with frame hinges 108 to achieve the desired level surface. Additionally, in an embodiment, spacer rings 206 may be used with spacer bars 210 and o-rails 116 to achieve the desired elevation to support an upper support cushion 114.

Figure 13A:
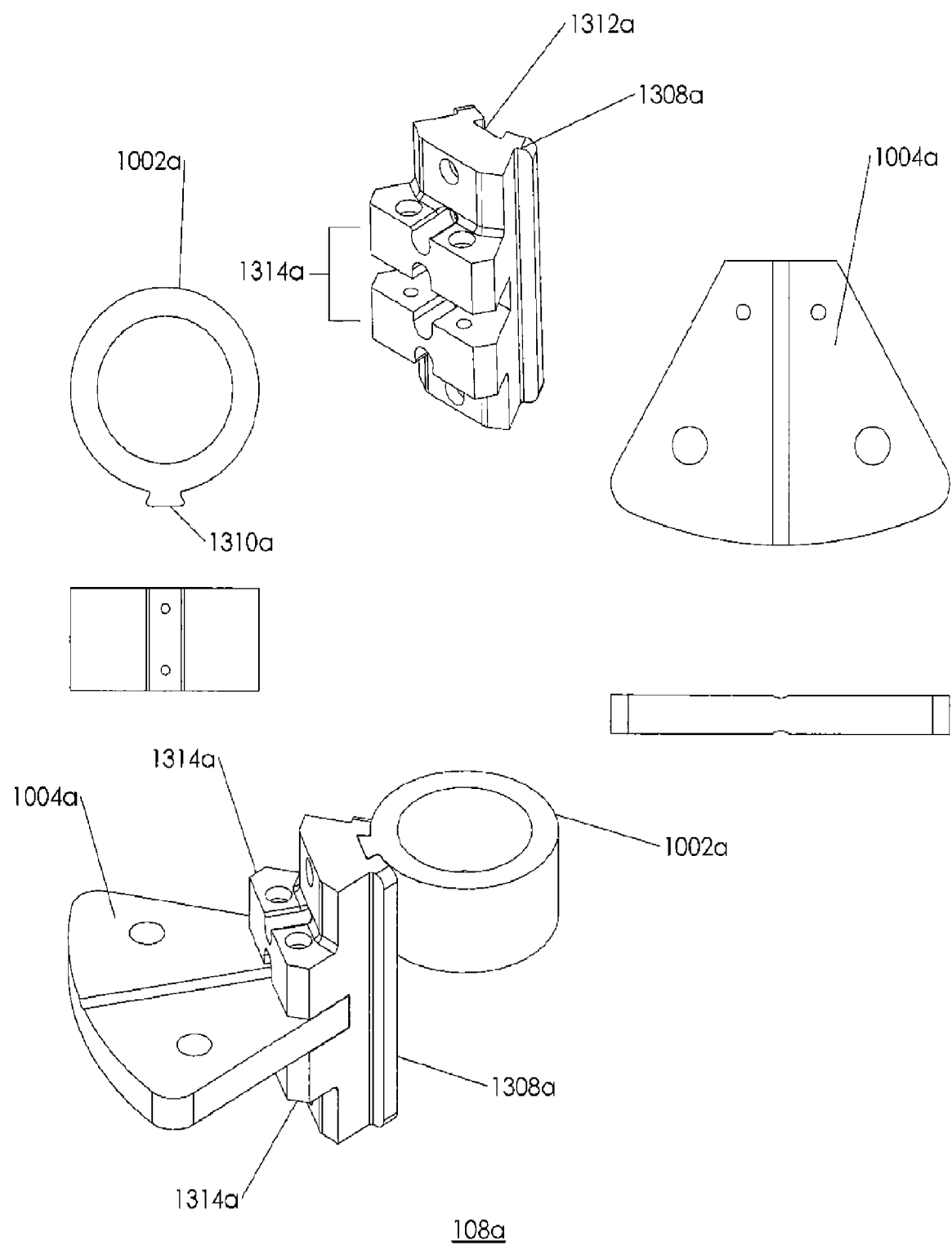
FIG. 13A illustrates an alternative embodiment of a frame hinge of the furniture system described herein.

FIG. 13A depicts an alternative embodiment of a frame hinge 108a, formed from individual pieces. As depicted, this embodiment of the frame hinge 108a can be assembled from a ring portion 1002a, a hinge base 1308a, and one or more flange portions 1004a. Here, the ring portion 1002a, hinge base 1308a and flange portions 1004a are each machined separate and assembled to form a completed frame hinge. Separate machining and assembly may reduce manufacture costs. In other embodiments, the ring portion 1002a may be produced as a separate component, while the hinge base 1302a and flange portions 1004a are formed as a single component. Alternatively, the flange portions 1004a may be formed as separate components and the ring portion 1002a and hinge base 1308a may be formed as a single component.

When assembled, the ring portion 1002a can be formed with a tab 1310a that can be fitted into a ring channel 1312a of the hinge base 1308a. The ring portion 1002a can be secured to the hinge base 1308a using a bolt, cotter pin or any other suitable mechanism. The flange portion 1004a is fitted between hinge base projections 1314a. The flange portion or portions 1004a can be secured to the hinge base 1308a using a bolt, cotter pin or any other suitable mechanism. FIG. 13A depicts a frame hinge 108a with a flange portion 1004a and a ring portion 1002a associated with a single hinge base 1308a. However, in other embodiments, the ring portion 1002a can include one or more additional tabs 1310a, such that the ring portion 1002a can be assembled with two or more hinge bases 1308a. Each hinge base 1308a, can support a separate flange portion 1004a, such that the frame hinge 108a is capable of connecting multiple triangular frames 102 with a single ring portion 1002a.

Figure 14:
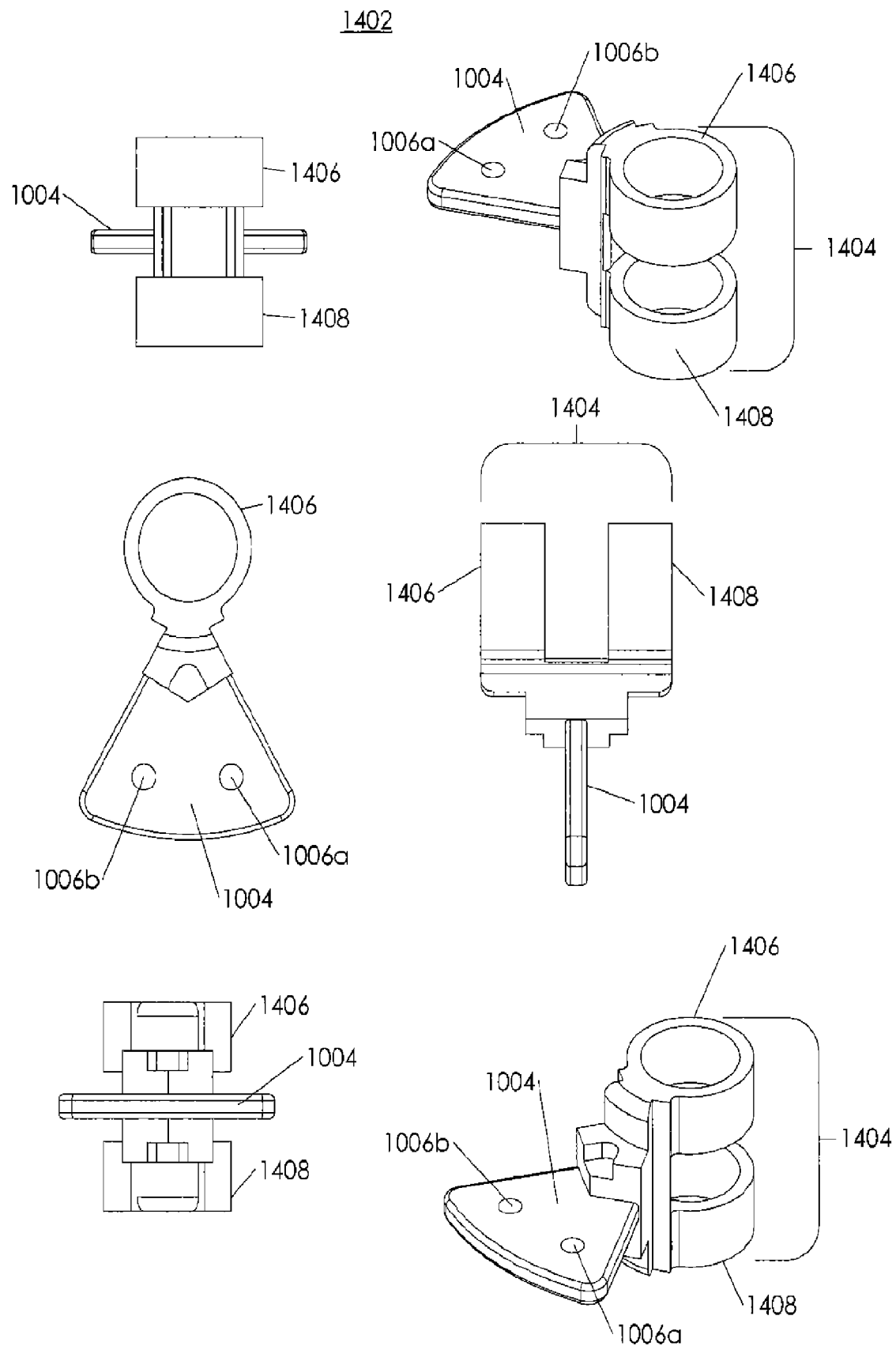
FIG. 14 illustrates an exemplary frame hinge with a twin ring for the furniture system described herein.

FIG. 14 shows an exemplary twin ring frame hinge 1402 from various angles. In certain embodiments a twin ring frame hinge 1402 may be used to connect frame rails 222. The twin ring frame hinge 1402 is comprised of a twin ring portion 1404 having an upper ring portion 1406 and a lower ring portion 1408, and a connecting mechanism for interconnecting the twin ring frame hinge 1402 to the receiving mechanism of a frame rail 222. The twin ring portion 1404 is useful in configurations where additional stability is desired when connecting items to the vertical supports 204. In one embodiment, the connecting mechanism is a flange portion 1004.

Figure 15:
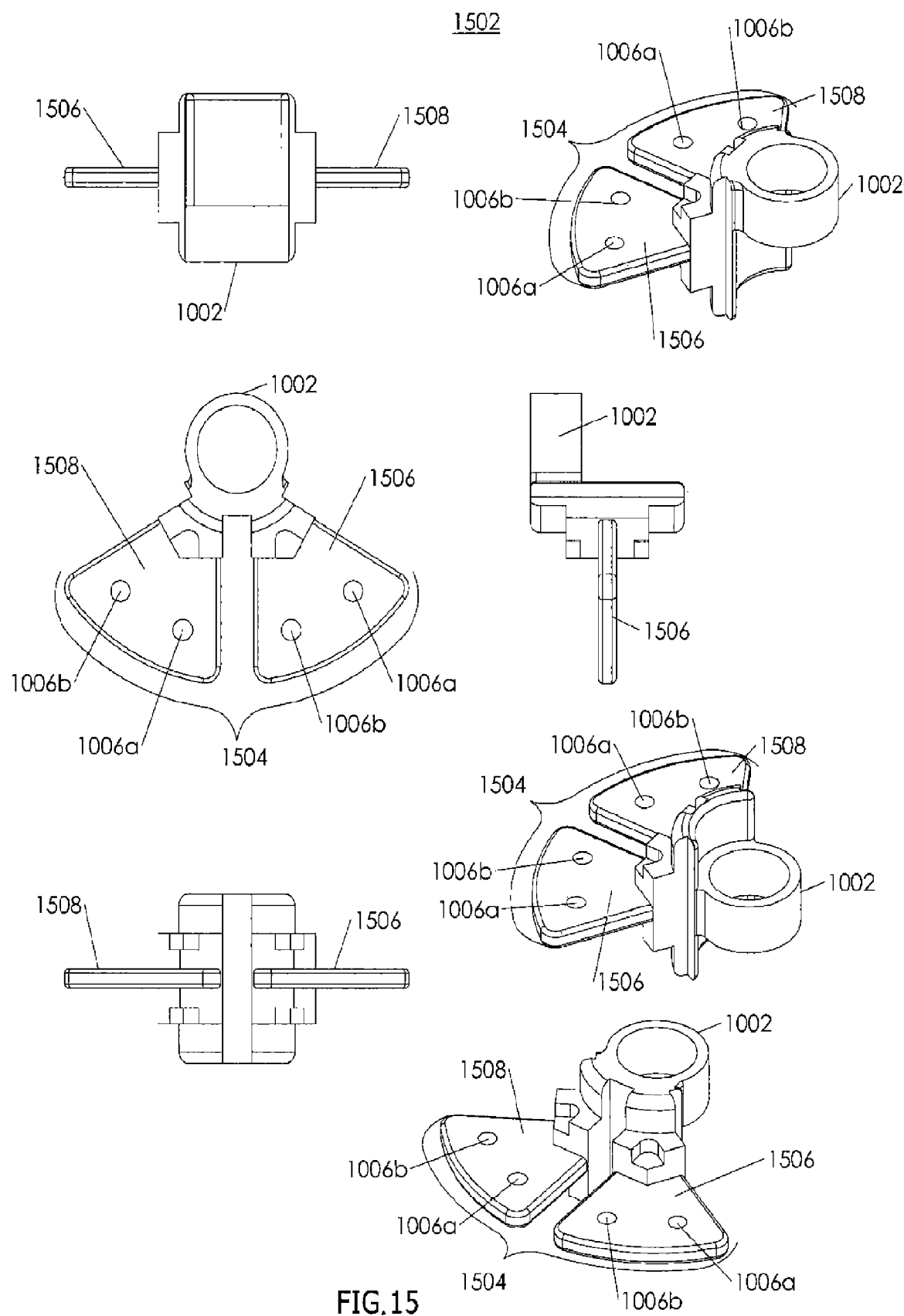
FIG. 15 illustrates an exemplary frame hinge with two flanges for the furniture system described herein.

FIG. 15 shows an exemplary double flange frame hinge 1502 from various angles. In certain embodiments a double flange frame hinge 1502 may be used to connect frame rails 222. The double flange frame hinge 1502 is capable of supporting two triangular frames 102, allowing two triangular frames 102 to be connected using a single frame hinge of this type, rather than requiring a separate frame hinge 108 to connect each of the triangular frames 102 at the vertex 224. The double flange frame hinge 1502 is comprised of ring portion 1002 and a double flange portion 1504 having a first flange portion 1506 and a second flange portion 1508. In an embodiment, the first flange portion 1506 and the second flange portion 1508 each may function separately as a flange portion 1004 when connecting frame rails 222 as depicted in FIGS. 10-12.

Figure 16:
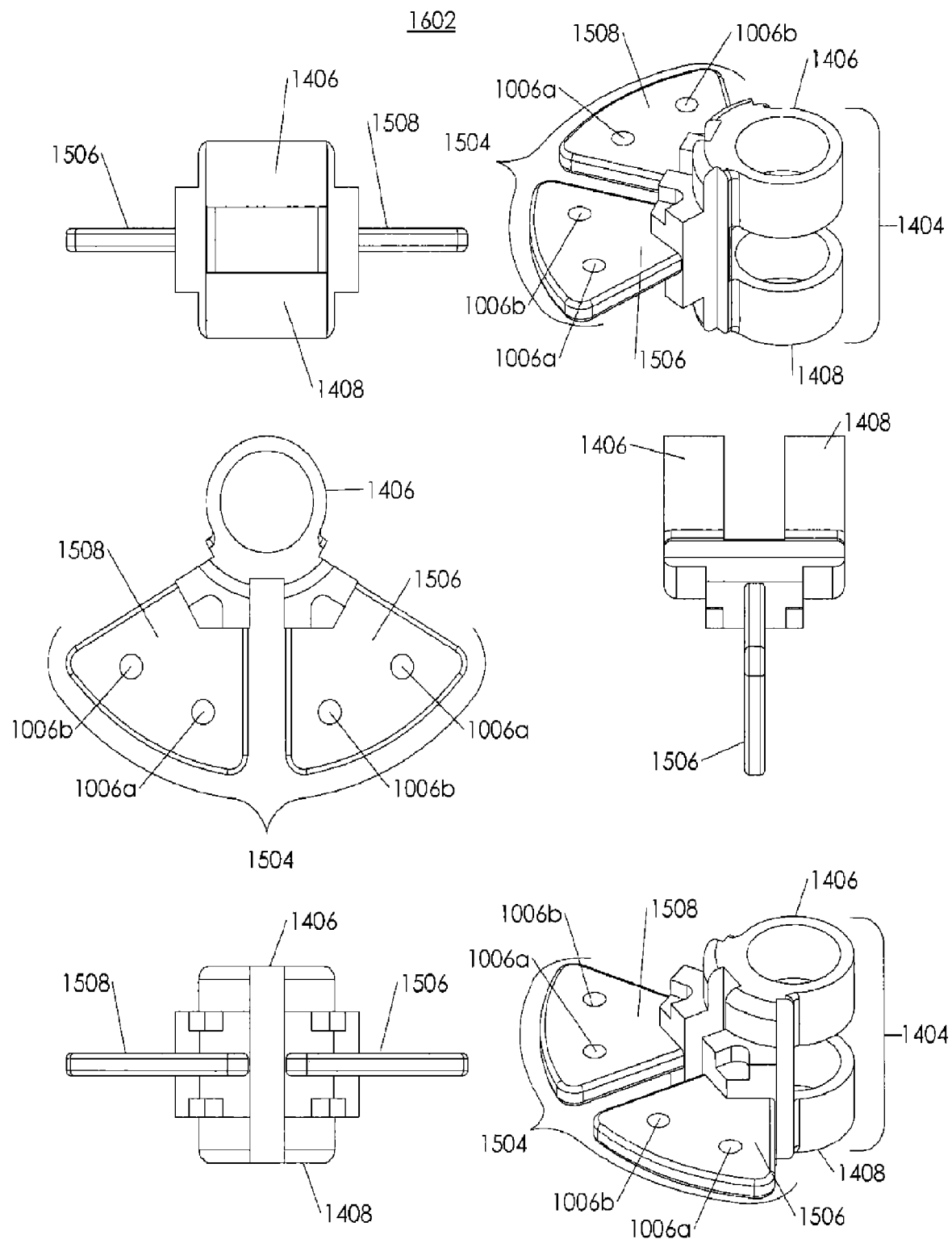
FIG. 16 illustrates an exemplary frame hinge with two flanges and a twin ring for the furniture system described herein.

FIG. 16 shows an exemplary double flange twin ring frame hinge 1602 from various angles. Similar to the embodiment of the double flange frame hinge 1502 shown in FIG. 15, the double flange twin ring frame hinge 1602 allows a single frame hinge of this type to connect two triangular frames 102. In certain embodiments a double flange twin ring frame hinge 1602 may be used to connect frame rails 222. The double flange twin ring frame hinge 1602 is comprised of a double flange 1504 having a first flange portion 1506 and a second flange portion 1508, and a twin ring portion 1404 having an upper ring portion 1406 and a lower ring portion 1408.

Figure 17:
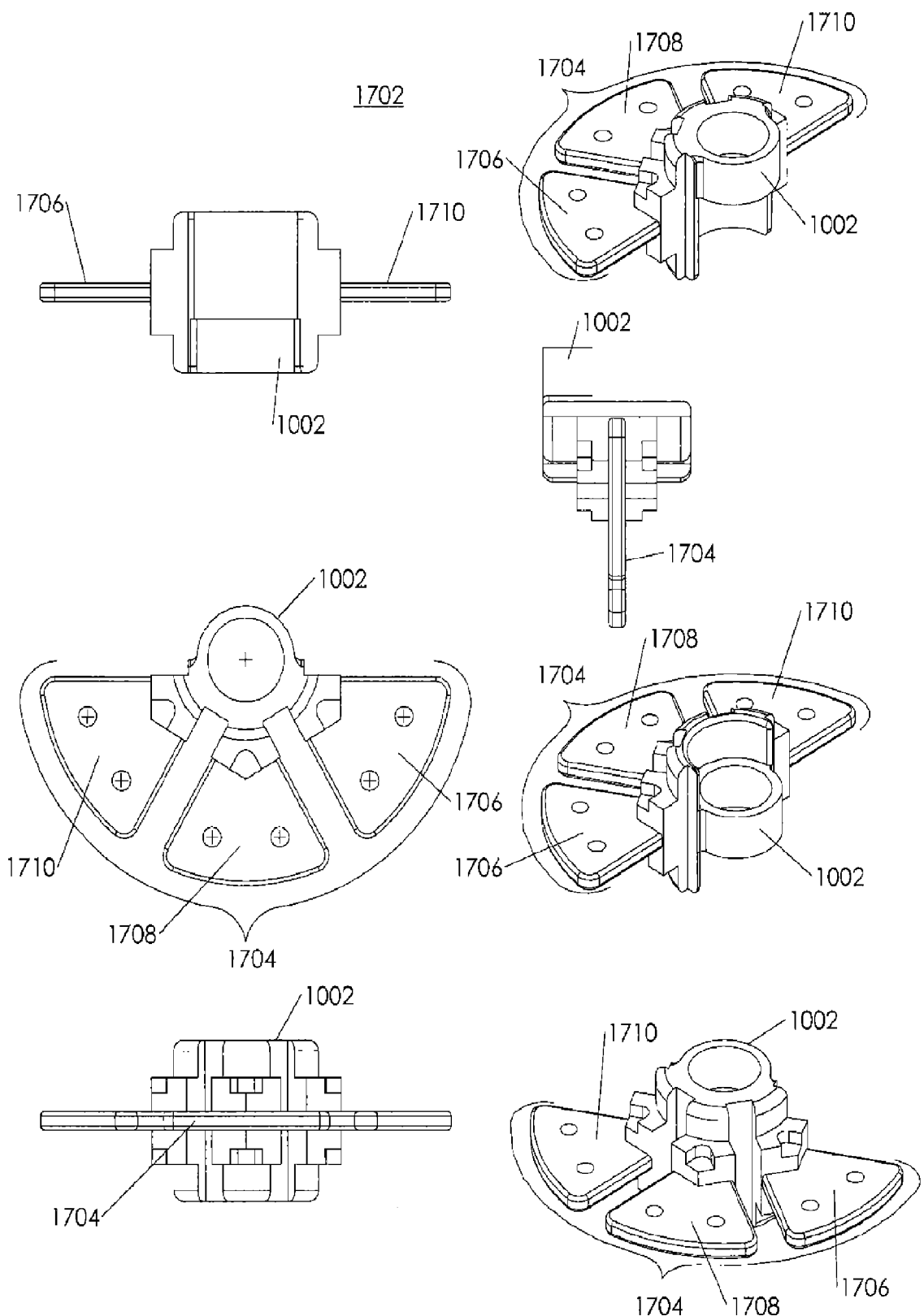
FIG. 17 illustrates an exemplary frame hinge with three flanges for the furniture system described herein.

FIG. 17 shows an exemplary triple flange frame hinge 1702 from various angles. The triple flange frame hinge 1702 is capable of supporting three triangular frames 102, allowing three triangular frames 102 to be connected using a single frame hinge of this type, rather than requiring a separate single flange frame hinge 108 to connect each of the triangular frames 102 at the vertex 224. Two triple flange frame hinges 1702 can be combined to support six triangular frames 102 in a triangular configuration as shown in FIG. 4. In certain embodiments, a triple flange frame hinge 1702 may be used to connect frame rails 222. The triple flange frame hinge 1702 is comprised of a ring portion 1002 and a triple flange portion 1704 having a first flange portion 1706, a second flange portion 1708, and a third flange portion 1710. In an embodiment, the first flange portion 1706, the second flange portion 1708, and the third flange portion 1710 each may function separately as a flange portion 1004 when connecting frame rails 222 as depicted in FIGS. 10-12.

Figure 18:
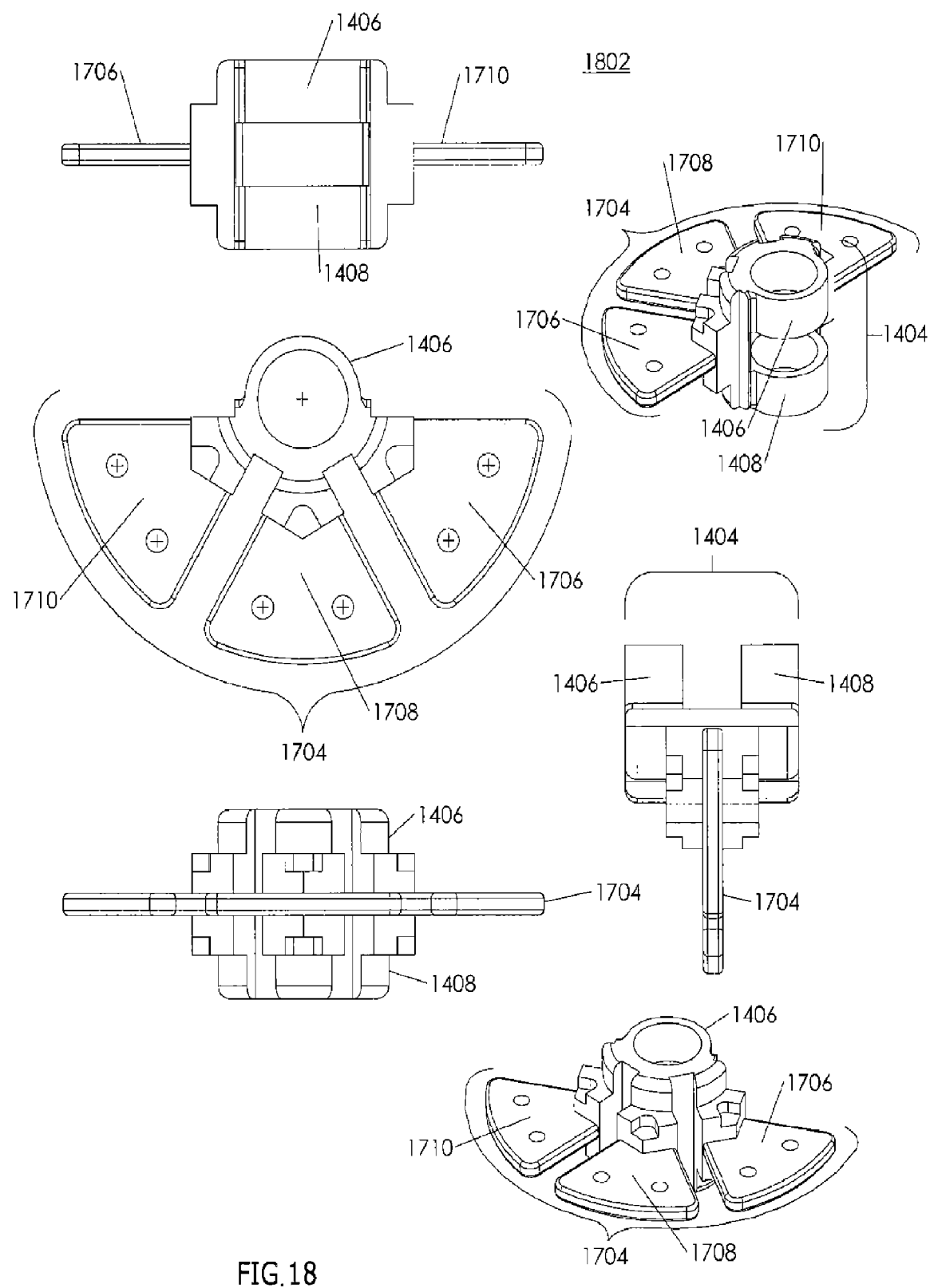
FIG. 18 illustrates an exemplary frame hinge with three flanges and a twin ring for the furniture system described herein.

FIG. 18 shows an exemplary triple flange twin ring frame hinge 1802 from various angles. Similar to the embodiment of the triple flange frame hinge 1702 shown in FIG. 17, the triple flange twin ring frame hinge 1602 allows a single frame hinge of this type to connect three triangular frames 102. In certain embodiments a triple flange twin ring frame hinge 1802 may be used to connect frame rails 222. The triple flange twin ring frame hinge 1802 is comprised of a triple flange portion 1704 having a first flange portion 1706, a second flange portion 1708, and a third flange portion 1710, and a twin ring portion 1404 having an upper ring portion 1406 and a lower ring portion 1408.

The vertical positioning of the flange portions relative to each other and to the ring portions as depicted in FIGS. 13-18 are examples. It is understood to those of ordinary skill in the art that the flange portions and the ring portions may be located in any number of vertical positions relative to each other, including having a means to adjust the vertical position of the flange portions relative to each other and to the ring portions. Furthermore, the distribution of the flange portions relative to each other depicted in FIGS. 15-18 are examples. It is understood to those of ordinary skill in the art that the flange portions may be distributed about the ring portions in any number of degrees relative to each other, including but not limited to adjacent and touching to each other to equally distributed around the ring portions.

Figure 19:
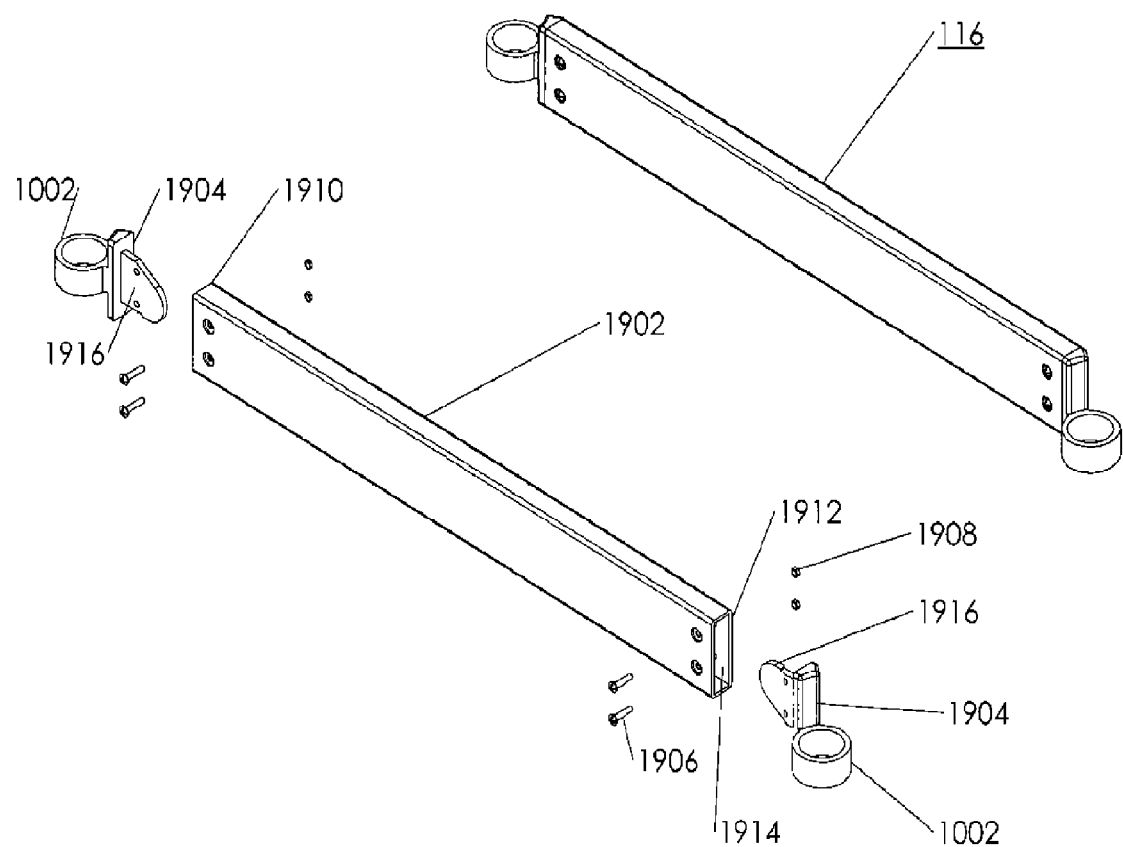
FIG. 19 illustrates an exemplary o-rail for the furniture system described herein.

FIG. 19 shows a disassembled exemplary o-rail 116. In an embodiment, each o-rail 116 is comprised of an o-rail member 1902 having a first end 1910 and a second end 1912, with a receiving mechanism within said first end 1910 and said second end 1912, and two o-rail frame hinges 1904. Each o-rail hinge 1904 has a ring portion 1002 and a connecting mechanism for interconnecting the o-rail hinge 1904 to the receiving mechanism of an o-rail member 1902. In one embodiment, the connecting mechanism is a vertical flange portion 1916 and the receiving mechanism is an interior channel 1914 such that the vertical flange portion 1916 of an o-rail hinge 1904 slides into and is disposed within the interior channel 1914 of an o-rail member 1902, thereby interconnecting the o-rail member 1902 with the o-rail hinge 1904. Also, in certain embodiments nuts 1908 and bolts 1906 are used to further secure an o-rail member 1902 to the vertical flange portion 1916 of an o-rail hinge 1904. The use of nuts 1908 and bolts 1906 to secure an o-rail member 1902 to the vertical flange portion 1916 of an o-rail hinge 1904 is for convenience. It is understood to those of ordinary skill in the art that other means for securing two component parts of a frame work equally as well. In embodiments, the relative position of the ring portion 1002 on the o-rail hinge 1904 may vary, similar to the manner in which the flange portion 1004 can vary in position relative to the ring portion 1002 of the frame hinge, as described with respect to FIG. 13. This potential to vary position of the ring portion 1002 allows the o-rail 116 to be connected to other o-rails 116, such that the o-rails are of even height.

Figure 20:
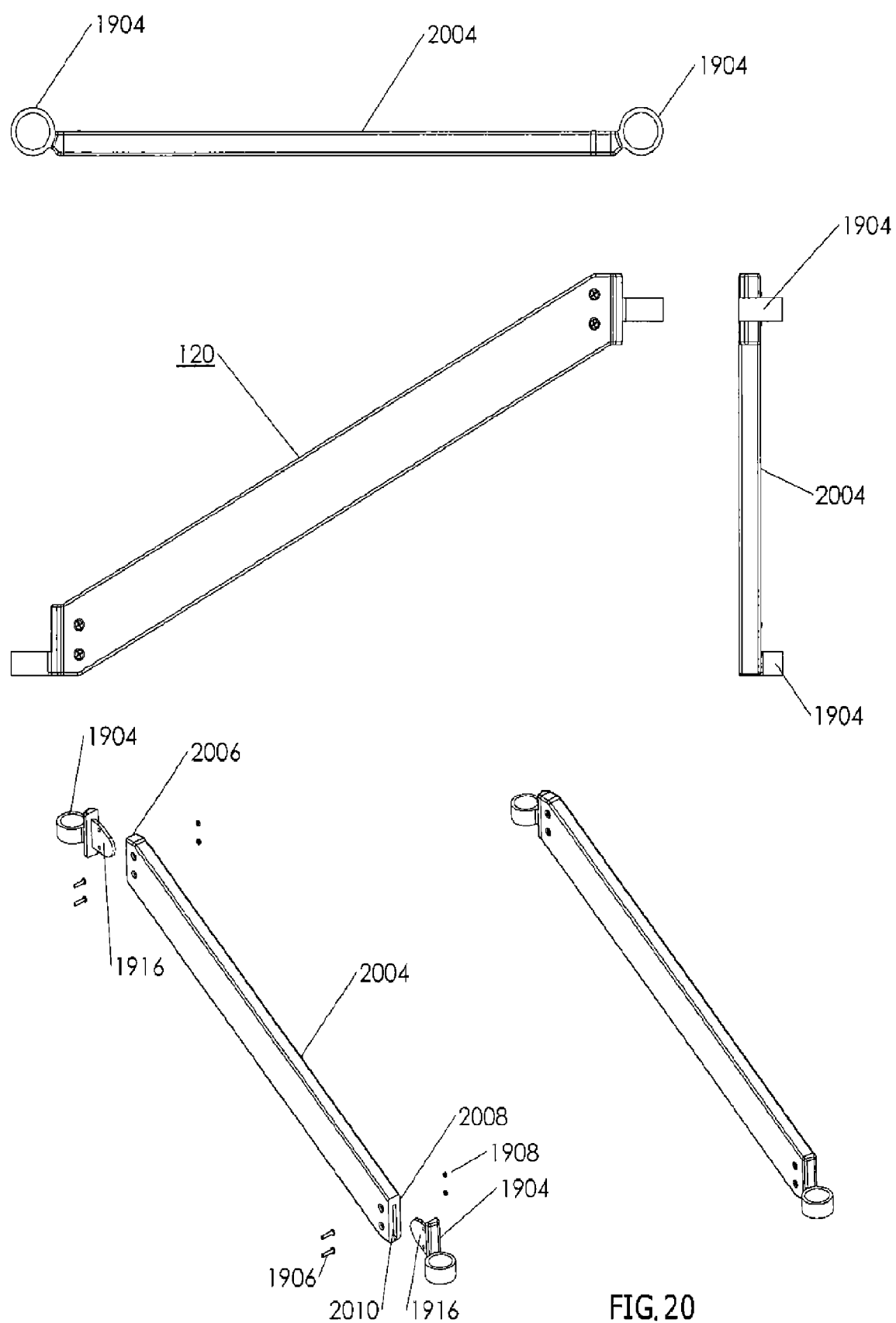
FIG. 20 illustrates an exemplary diagonal support rail for the furniture system described herein.

FIG. 20 shows a disassembled diagonal support rail 120. In embodiments, each diagonal support rail 120 is comprised of a diagonal rail member 2004 having a first angled end 2006 and a second angled end 2008, with a receiving mechanism within said first angled end 2006 and said second angled end 2008, and two o-rail frame hinges 1904. Each o-rail hinge 1904 has a ring portion 1002 and a connecting mechanism for interconnecting the o-rail hinge 1904 to the receiving mechanism of an diagonal rail member 2004. In one embodiment, the connecting mechanism is a vertical flange portion 1916 and the receiving mechanism is an interior channel 2010 such that the vertical flange portion 1916 of an o-rail hinge 1904 slides into and is disposed within the interior channel 2010 of an diagonal rail member 2004, thereby interconnecting the diagonal rail member 2004 with the o-rail hinge 1904. Also, in certain embodiments nuts 1908 and bolts 1906 are used to further secure an diagonal rail member 2004 to the vertical flange portion 1916 of an o-rail hinge 1904. The use of nuts 1908 and bolts 1906 to secure an diagonal rail member 2004 to the vertical flange portion 1916 of an o-rail hinge 1904 is for convenience. It is understood to those of ordinary skill in the art that other means for securing two component parts of a frame work equally as well.

Figure 21:
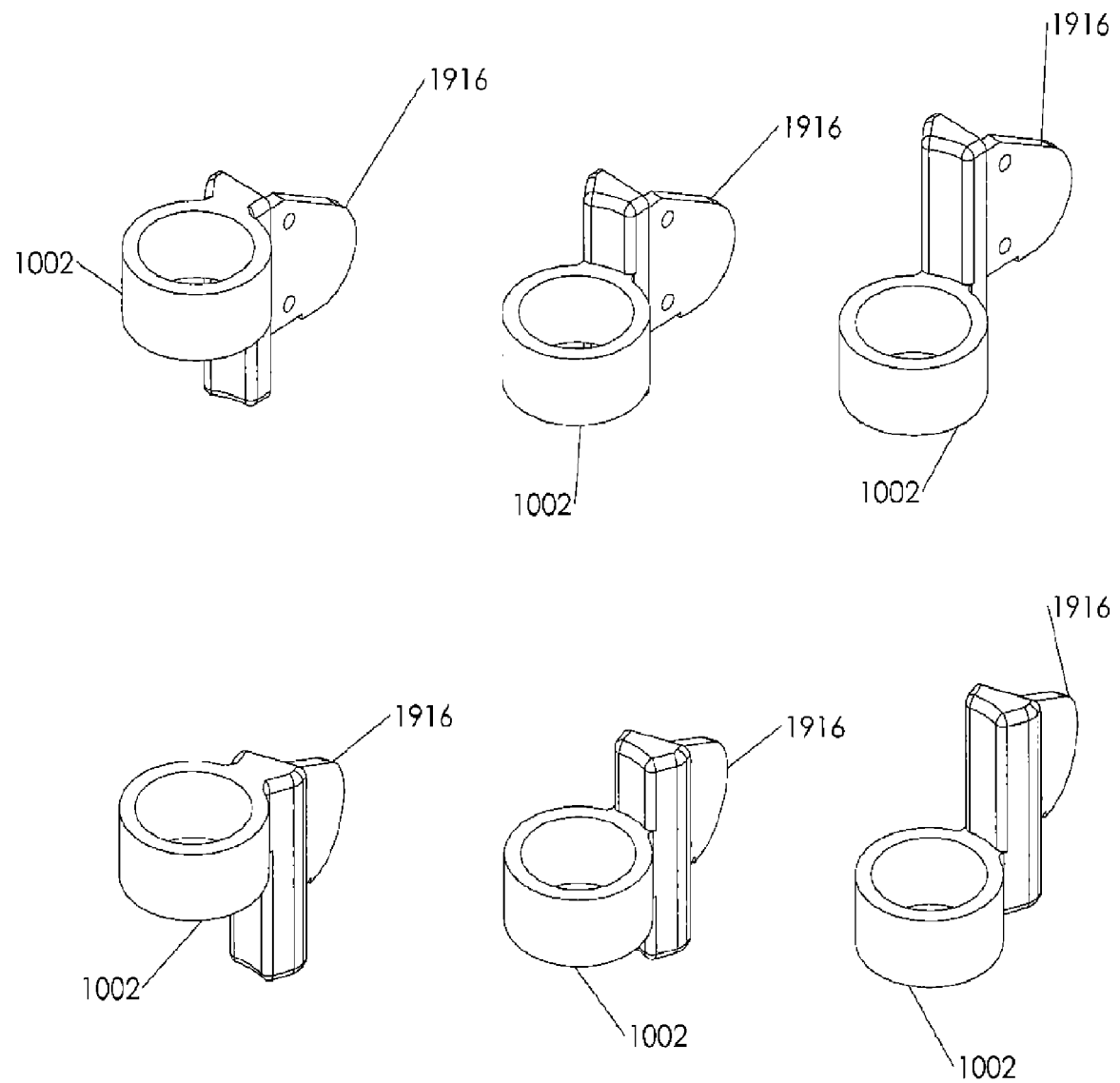
FIG. 21 illustrates six exemplary o-rail hinges for the furniture system described herein.

FIG. 21 shows six exemplary o-rail hinges 1904. The exemplary o-rail hinges depicted in FIG. 21 show various configurations of the ring portions 1002 and the vertical flange portion 1916. The configurations depicted in FIG. 21 are only examples. It is understood to those of ordinary skill in the art that other configurations are possible.

Figure 22:
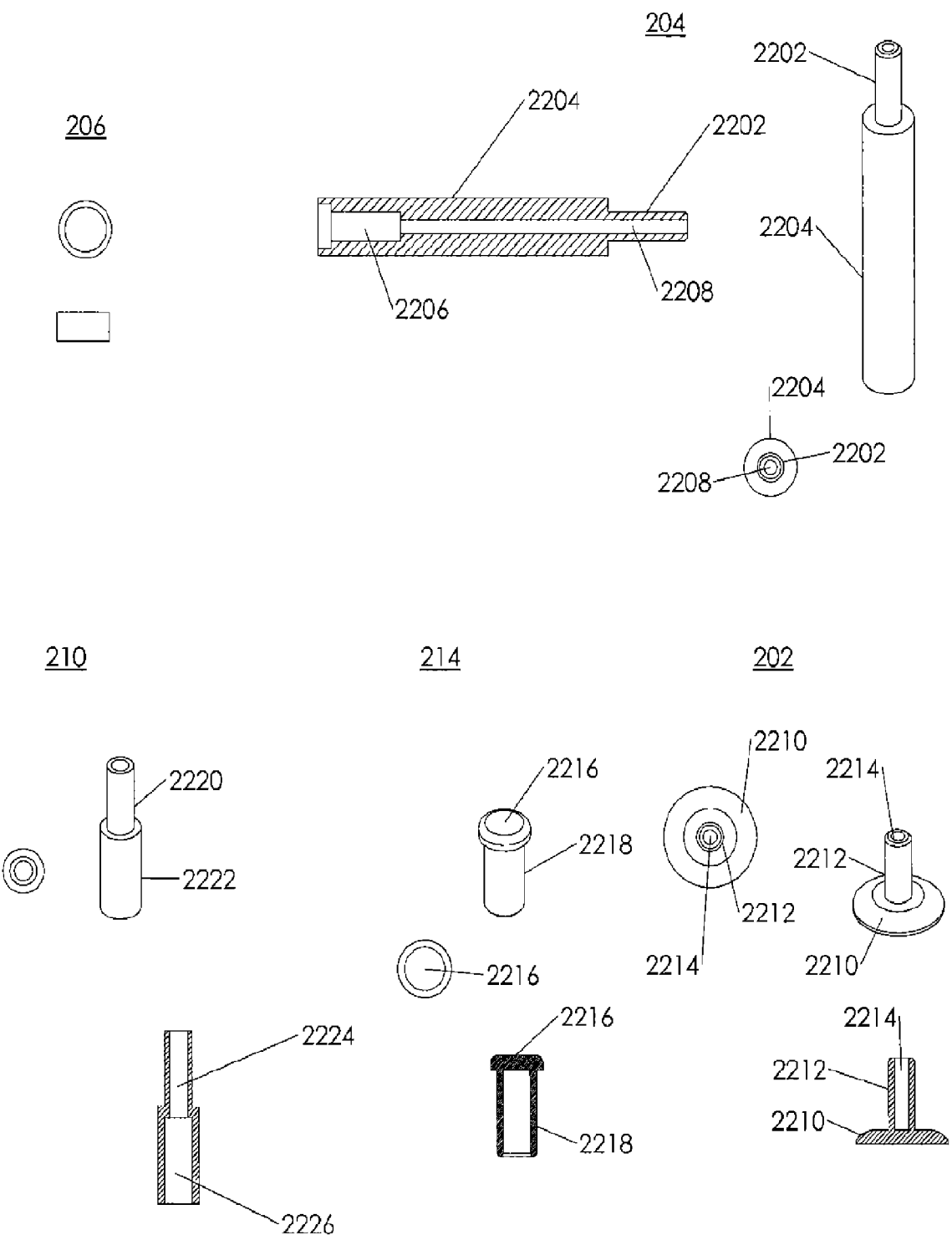
FIG. 22 illustrates exemplary vertical supports, bottom caps, spacer rings, spacer bars, and top caps for the furniture system described herein.

FIG. 22 shows exemplary vertical supports 204, bottom caps 202, spacer rings 206, spacer bars 210, and top caps 214. The vertical support 204 is comprised of top portion 2202 and a bottom portion 2204, with a receiving mechanism within said top portion 2202 and said bottom portion 2204. In an embodiment, the vertical support 204 is cylindrical in shape with the diameter of the top portion 2202 being smaller than the diameter of the bottom portion 2204. In an embodiment, the receiving mechanism in the bottom portion 2204 is a countersunk bore hole 2206, and the receiving mechanism in the top portion 2202 is an aperture 2208. In an embodiment, the countersunk bore hole 2206 is adapted to receive a bottom cap 202. The bottom cap 202 is comprised of a base portion 2210 and a vertical support portion 2212, with a receiving mechanism within said vertical support portion 2212. In an embodiment, the receiving mechanism in the vertical support portion 2212 is an aperture 2214. The spacer ring 206 is comprised of an open-ended hollow cylinder which is adapted to be slidably removable onto a vertical support 204. The top cap 214 is comprised of a cap portion 2216 and a tube portion 2218, which is adapted to be slidably removable onto a spacer bar 210. The spacer bar 210 is comprised of a top portion 2220 and a bottom portion 2222, with a receiving mechanism within said top portion 2220 and said bottom portion 2222. In an embodiment, the spacer bar 210 is cylindrical in shape with the diameter of the top portion 2220 being smaller than the diameter of the bottom portion 2222. In an embodiment, the receiving mechanism in the bottom portion 2222 is an aperture 2226, and the receiving mechanism in the top portion 2220 is an aperture 2224. In an embodiment the spacer bar 210 is adapted to be slidably removable onto a vertical support 204.

Conclusion

While various embodiments of the present invention have been described above, it should be understood that they have been presented by the way of example only, and not limitation. It will be understood by those skilled in the art that various changes in form and details may be made therein without departing from the spirit and scope of the invention as defined. Thus, the breadth and scope of the present invention should not be limited by any of the above-described exemplary embodiments.

What is claimed is:

1. A modular furniture system, comprising:
   a triangular frame having three frame rails and three vertices, each frame rail having a first receiving mechanism and a second receiving mechanism within an interior side of said frame rail;
   a frame surface generally triangular shaped and adapted to be positioned within said triangular frame in contact with said second receiving mechanism for providing a physical top surface;
   a leg support system having three vertical supports for supporting said triangular frame at said vertices and being slidably removable from said triangular frame; and
   a hinge system having three frame hinges, each frame hinge comprising a ring portion and a flange portion wherein said ring portion removably slides over a top end of one of said vertical supports and said flange portion detachably interconnects into said first receiving mechanism of two said frame rails.

2. The modular furniture system of claim 1, wherein said first receiving mechanism of each of said frame rails is an interior channel.

3. The modular furniture system of claim 1, wherein said flange portion of each of said frame hinge is generally triangular in shape.

4. The modular furniture system of claim 1, wherein said frame surface is a hard surface or a soft surface.

5. The modular furniture system of claim 1, further comprising a fourth vertical support slidably interconnects onto a top end of one of said three vertical supports to achieve varying elevations for said triangular frame.

6. The modular furniture system of claim 1, further comprising:
   a first tier comprised of said triangular frame, said leg support system, and said hinge system;
   a second tier comprised of a second triangular frame, whereby said second tier is supported by a second leg support system and a second hinge system above said first tier.

7. The modular furniture system of claim 1, further comprising:
   an o-rail member having a receiving mechanism within an interior side of said o-rail member;
   a fourth vertical support slidably and removably interconnecting onto a top end of one of said three vertical supports of said leg support system;
   a fifth vertical support slidably and removably interconnecting onto a top end of a second of said three vertical supports of said leg support system;
   two o-rail hinges, each o-rail hinge comprising a ring portion and a flange portion wherein said ring portion of a first o-rail hinge removably slides over a top end of said fourth vertical support and a second o-rail hinge removably slides over a top end of said fifth vertical support, and said flange portion of said first o-rail hinge detachably interconnects into said receiving mechanism of a first end of said o-rail member and said flange portion of said second o-rail hinge detachably interconnects into said receiving mechanism of a second end of said o-rail member.

8. The modular furniture system of claim 7, further comprising an upper support cushion.

9. The modular furniture system of claim 1, further comprising a decorative panel slidably and removably interconnected with an exterior surface of one said frame rail of said triangular frame.

10. The modular furniture system of claim 1, further comprising:
- a second triangular frame having three frame rails and three vertices, each frame rail having a first receiving mechanism and a second receiving mechanism within an interior side of said frame rail;
- a second frame surface generally triangular shaped and adapted to be positioned within said second triangular frame in contact with said second receiving mechanism for providing a physical top surface;
- a fourth vertical support for supporting said second triangular frame at a first of said vertices and being slidably removable from said second triangular frame;
- a second hinge system having at least one frame hinge comprising a ring portion and a flange portion wherein said ring portion removably slides over a top end of one of said fourth vertical support and said flange portion detachably interconnects into said first receiving mechanism of two said frame rails of said second triangular frame;
- wherein said leg support system of said triangular frame supports said second triangular frame at a second and third of said vertices of said second triangular frame and being slidably removable from said second triangular frame;
- wherein at least one of said frame hinges of said hinge system detachably interconnects with said first receiving mechanism of two of said frame rails of said second triangular frame.

11. The modular furniture system of claim 10, further comprising:
- a third triangular frame having three frame rails and three vertices, each frame rail having a first receiving mechanism and a second receiving mechanism within an interior side of said frame rail;
- a third frame surface generally triangular shaped and adapted to be positioned within said third triangular frame in contact with said second receiving mechanism for providing a physical top surface;
- a fifth vertical support for supporting said third triangular frame at a first of said vertices and being slidably removable from said third triangular frame;
- a third hinge system having at least one frame hinge comprising a ring portion and a flange portion wherein said ring portion removably slides over a top end of said fifth vertical supports and said flange portion detachably interconnects into said first receiving mechanism of two said frame rails of said third triangular frame;
- wherein said leg support system of said triangular frame supports said third triangular frame at one of said vertices of said third triangular frame and being slidably removable from said third triangular frame;
- wherein said fourth vertical support for supporting said second triangular frame supports said third triangular frame at one of said vertices of said third triangular frame and being slidably removable from said third triangular frame;
- wherein said flange portion of at least one of said frame hinges of said hinge system detachably interconnects into said first receiving mechanism of two of said frame rails of said third triangular frame.

12. The modular furniture system of claim 10, wherein said flange portion of said at least one of said frame hinges of said hinge system that detachably interconnects into said first receiving mechanism of two of said frame rails of said second triangular frame has a first flange portion that detachably interconnects into said first receiving mechanism of said two of said frame rails of said second triangular frame and a second flange portion that detachably interconnects into said first receiving mechanism of said two said frame rails of said triangular frame.

13. The modular furniture system of claim 1, further comprising a spacer ring that removably slides over the top end of one of said vertical supports.

14. The modular furniture system of claim 1, wherein said flange portion of each of said frame hinges is secured to said first receiving mechanism of one of said frame rails with a fastener.

15. The modular furniture system of claim 1, further comprising:
- a second triangular frame having three frame rails and three vertices, each frame rail having a first receiving mechanism and a second receiving mechanism within an interior side of said frame rail;
- a second frame surface generally triangular shaped and adapted to be positioned within said second triangular frame in contact with said second receiving mechanism for providing a physical top surface;
- a fourth vertical support for supporting said second triangular frame at a first of said vertices and being slidably removable from said second triangular frame;
- a second hinge system having at least three frame hinges, each frame hinge comprising a ring portion and a flange portion wherein said ring portion removably slides over a top end of one of said vertical supports supporting said second triangular frame and said flange portion detachably interconnects into said first receiving mechanism of two said frame rails of said second triangular frame; and
- wherein said leg support system of said triangular frame supports said second triangular frame at a second and third of said vertices of said second triangular frame and being slidably removable from said second triangular frame.

16. The modular furniture system of claim 1, further comprising:
- a second triangular frame having three frame rails and three vertices, each frame rail having a first receiving mechanism and a second receiving mechanism within an interior side of said frame rail;
- a second frame surface generally triangular shaped and adapted to be positioned within said second triangular frame in contact with said second receiving mechanism for providing a physical top surface;
- a second leg support system having three vertical supports for connecting said second triangular frame at said vertices and being slidably removable from said second triangular frame;
- wherein one of said vertical supports of said second leg support system slidably interconnects onto a top end of one of said three vertical supports of said leg support system with a top end of said one of said vertical supports of said second leg support system elevated above the top end of said one of said three vertical supports of said leg support system;
- a second hinge system having three frame hinges, each frame hinge comprising a ring portion and a flange portion wherein said ring portion removably slides over a top end of one of said vertical supports of said second leg support system and said flange portion detachably interconnects into said first receiving mechanism of two said frame rails of said second triangular frame.

17. The modular furniture system of claim 16, wherein second triangular frame is supported by one of said three vertical supports of the leg support system above said triangular frame.

18. The modular furniture system of claim 16, wherein said second triangular frame rotates about said vertical support interconnected onto the top end of said one of said three vertical supports of said leg support system.

19. The modular furniture system of claim 16, wherein said frame surface of said triangular frame is a soft surface and said second frame surface of said second triangular frame is a hard surface.

\* \* \* \* \*